United States Patent [19]

Fujikawa et al.

[11] Patent Number: 5,092,188
[45] Date of Patent: Mar. 3, 1992

[54] TRANSFER CASE MOTOR CONTROL APPARATUS FOR 4 WD MECHANISM

[75] Inventors: Satoshi Fujikawa; Horoshi Ninomiya, both of Hiroshima, Japan

[73] Assignee: Mazda Motor Corporation, Hiroshima, Japan

[21] Appl. No.: 437,658

[22] Filed: Nov. 17, 1989

[30] Foreign Application Priority Data

Nov. 18, 1988 [JP] Japan .................. 63-290185
Jan. 9, 1989 [JP] Japan ...................... 1-2522

[51] Int. Cl.5 .................. F16H 59/02; B60K 17/35
[52] U.S. Cl. .......................... 74/335; 180/249; 364/424.1
[58] Field of Search ............ 74/335, 336 R, 337; 364/424.1; 180/246, 247, 249

[56] References Cited

U.S. PATENT DOCUMENTS

| | | | |
|---|---|---|---|
| 4,484,653 | 11/1984 | Horikoshi et al. | 364/424.1 X |
| 4,704,920 | 10/1987 | Kurata | 180/249 X |
| 4,723,624 | 2/1988 | Kawasaki et al. | 180/249 X |
| 4,768,399 | 9/1988 | Kubo et al. | 180/249 X |
| 4,792,012 | 12/1988 | Morisawa et al. | 364/424.1 X |
| 4,830,132 | 5/1989 | Inagaki et al. | 364/424.1 X |
| 4,846,010 | 7/1989 | Fujikawa et al. | 74/335 X |
| 4,887,689 | 12/1989 | Naito | 364/424.1 X |
| 5,010,974 | 4/1991 | Matsuda | 180/247 X |

Primary Examiner—Leslie A. Braun
Assistant Examiner—Khoi Q. Ta
Attorney, Agent, or Firm—Fish & Richardson

[57] ABSTRACT

A control apparatus for a power train shifting mechanism is designed so as to deenergize a motor when a load larger than a given value is applied to the motor as a driving source in shifting a power train in accordance with a stroke displacement. When the shift position is shifted from a stroke end position to an intermediate position other then the stroke end position, a load value for deenergizing the motor is set to a larger value than that of shifting the shift position in other ways.

16 Claims, 18 Drawing Sheets

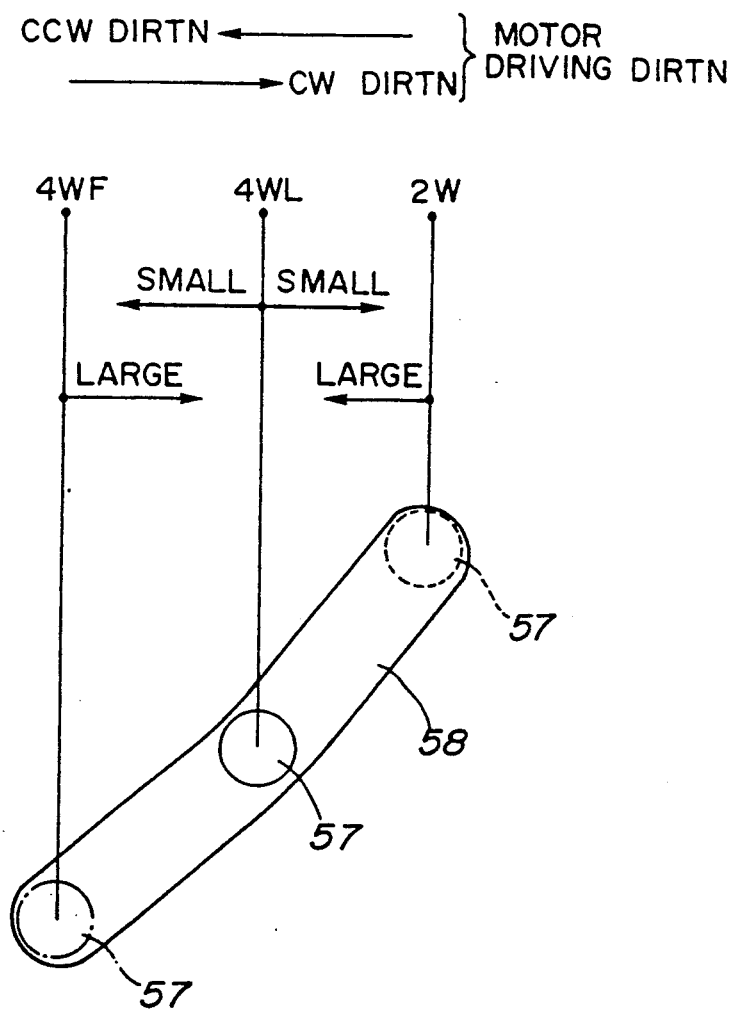

| POSITN SWITCH | 2W | $d$ | 4WL | $\beta$ | 4WF |
|---|---|---|---|---|---|
| FIRST (182) | OFF | OFF | ON | ON | ON |
| SECOND (183) | ON | OFF | OFF | OFF | ON |
| THIRD (184) | ON | ON | ON | OFF | OFF |

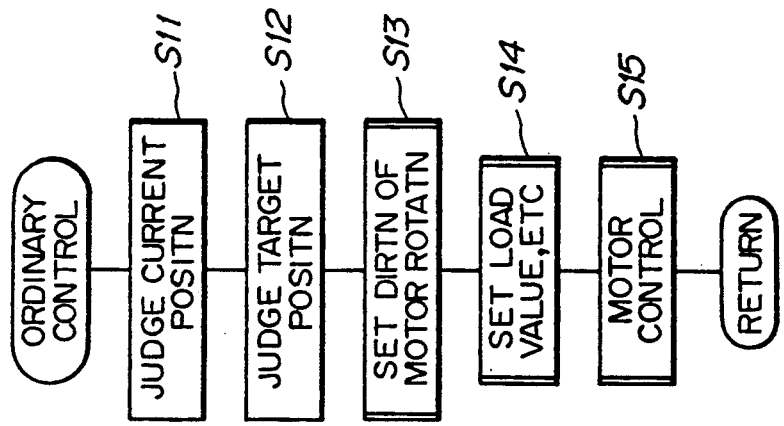
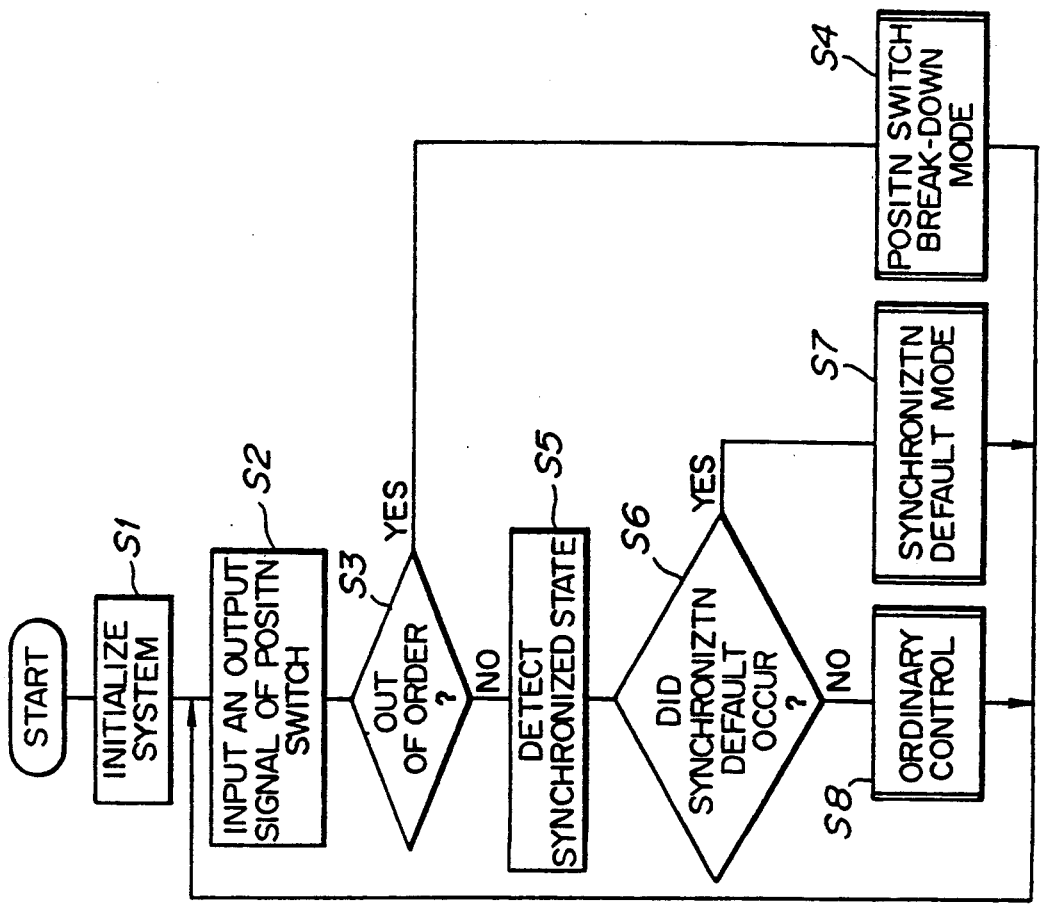

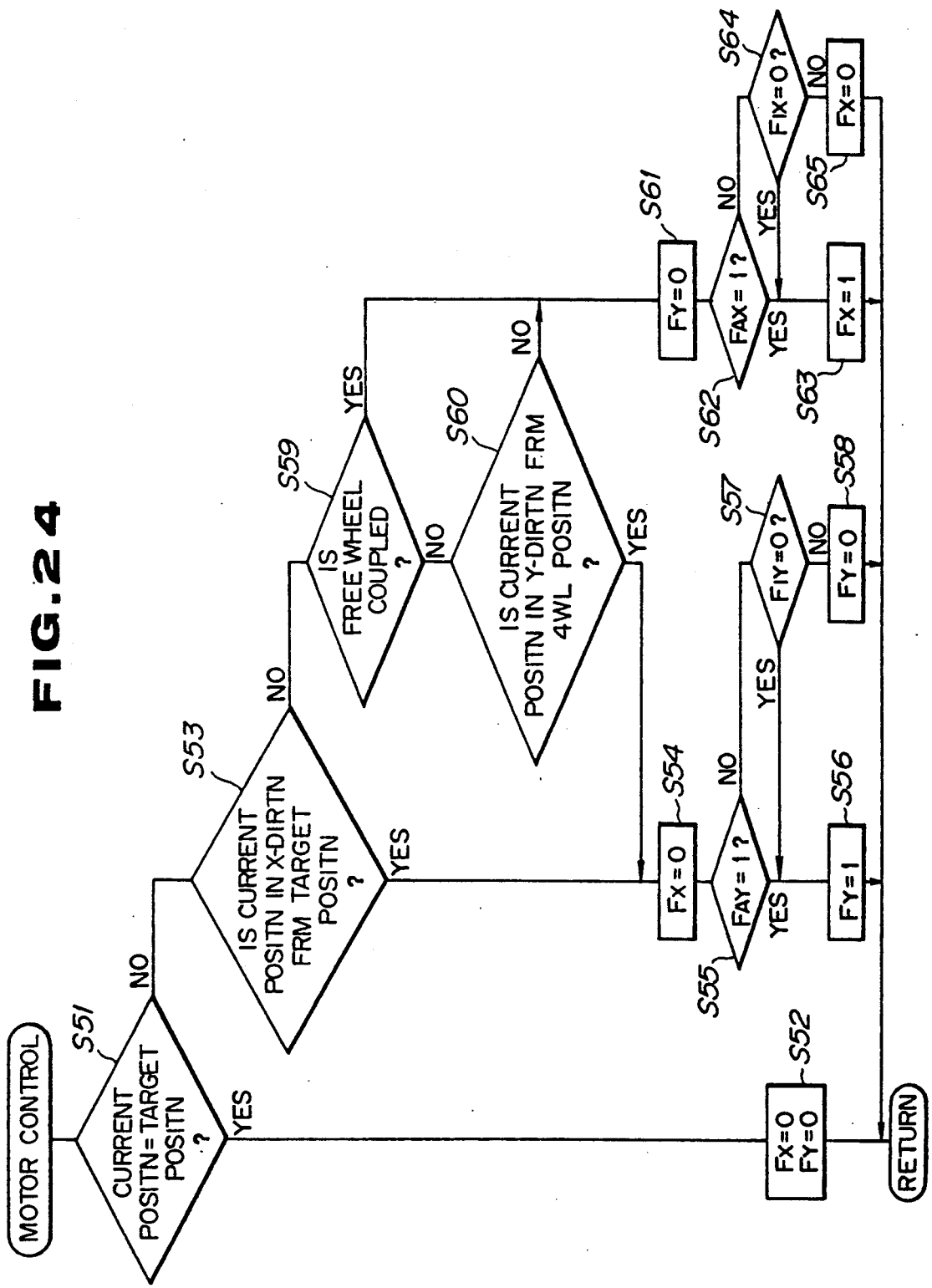

TRANSFER CASE MOTOR CONTROL APPARATUS FOR 4 WD MECHANISM

BACKGROUND OF THE INVENTION

1. Field of the Invention

The present invention relates to a control apparatus for a power train shifting mechanism.

2. Description of Related Art

For a four wheel drive vehicle in which all of the front and the rear wheels of the vehicle are driven, a center differential is disposed in its power train as disclosed in U.S. Pat. No. 4,804,061, thereby absorbing a difference between rotational velocities of the front and the rear wheels during cornering. The four wheel drive vehicles may be divided into a full-time four-wheel drive vehicle in which the four wheels are ordinarily driven and a part-time four-wheel drive vehicle in which two wheel and four wheel drive modes of operation can be manually shifted.

For the vehicles with part-time four-wheel drive as disclosed in Japanese Utility Model Publication (kokai) No. 127,232/1985, a shift mechanism movable in a stroke is provided such that a stroke position of the shift mechanism is changed to shift between two wheel and four wheel drive modes of operation. As disclosed therein, on the one hand, a power train is provided with a sleeve that is slidable in an axial direction and its displacement provides three positions, namely, a two wheel drive position at which transmission of a driving force to the front wheels or the rear wheels from one of the output elements of a center differential can be blocked, a four-wheel center-differential-locked drive position that blocks a differential operation of the center differential, and a four-wheel center-differential-free drive position that accepts a differential operation of the center differential. Accordingly, shifting such a power train requires at least three shift positions including the two wheel drive position, and the shift positions of the shift mechanism should take a position other than the stroke end position, namely, an intermediate position.

As shown in U.S. Pat. No. 4,846,010, on the other hand, the shift mechanism is driven by a motor to thereby reduce an operational force for shifting by the operator.

It is to be noted, however, that when the shift mechanism is driven by the motor, it may occur that the shift mechanism is not shifted to a given position for some reasons, whereby an overload could be applied to the motor. In order to prevent an overload to the motor, it is thus required that means for detecting a load, for detecting a magnitude of the load over the motor, be provided in such a manner that the motor is deenergized as the load detecting means is operated.

It has been found, however, that a situation may be likely to occur that an operator may misjudge an overload to deenergize the motor although no overload is applied to the motor, in such a manner that the operator selects the shift position when the overload is applied to the motor.

More specifically, the shift mechanism is usually constructed that, when it is shifted to one of the stroke end positions from an intermediate position other than the stroke end position, the driving, namely, the clockwise rotation, of the motor is deenergized upon a detection of the shifting to the stroke end position from the intermediate position. However, it may occur that the motor continues to be rotated in the clockwise direction due to inertia. At this time, notwithstanding deenergizing the motor, the motor may still continue rotating toward the stroke end position, thereby leading to operation of the load detecting means. As a result, it may become impossible to return the shift mechanism to the intermediate position from the stroke end position.

SUMMARY OF THE INVENTION

Therefore, the present invention has the object to provide a control apparatus for a power train shifting mechanism which permits an ensured shift of a shift mechanism, in which the shift mechanism for shifting the power train is driven by a motor and the motor is deenergized when an overload is applied to the motor.

In order to achieve the object, the present invention consists of a control apparatus for a power train shifting mechanism, comprising:

a shift mechanism for shifting a power train or a passage of transmitting power in accordance with a stroke displacement and for taking a shift position at least at a first position which is a stroke end position and at a second position which is an intermediate stroke position other than the stroke end position;

a motor functioning as a source of driving the shift mechanism in a stroke;

load detecting means for detecting a load to be applied to the motor;

deenergizing means for deenergizing the motor when the load to be applied to the motor is equal to greater than a given value; and load value shifting means for shifting a load value which is larger by comparing a load value for deenergizing the motor when the shift position is shifted from the first position to the second position with a load value for deenergizing the motor when the shift position is shifted from the second positon to the first position.

In accordance with the present invention, there is used a smaller value as the load value that deenergizes the motor when the shift position is shifted from the second to the first shift positions. This is advantageous in protecting the motor.

When the second shift position is selected after the first shift position has been selected, there is used a greater value as the load value that deenergizes the motor so that this permits an ensured drive of the motor toward the second shift position—toward a desired shift position. It is to be noted, however, that the larger load value is set to the smallest possible value with a magnitude of force driving the motor due to inertia taken into consideration.

With the arrangement as has been described, the present invention prevents an application of a large overload to the motor and ensures shifting to a desired shift position.

It is further to be noted that, only when the shift position is changed from the first to the second shift positions, a larger load value is used for deenergizing the motor so that the motor can be preferably protected from an overload.

In specific features, the present invention can be applied to shifting a driving system of part-time four wheel drive and/or to shifting a center differential between differential-locked and differential-free drive modes of operation. In preferred embodiments, the shifting of the driving system of part-time four wheel drive and the shifting of the center differential are implemented by means of a stroke displacement of a common sleeve of a shift mechanism. More specifically, sharing the shift mechanism with the part-time four wheel drive and the center differential can shorten the lentgth of a shaft of a transfer unit. Furthermore, when a subordinate variable speed gear assembly is provided, a layout is preferably constructed such that the subordinate variable speed gear assembly is disposed adjacent to the center differential as well as a shift mechanism of the subordinate variable speed gear assembly is disposed on the side opposite to the side on which the center differential is disposed and a shift mechanism of the center differential for shifting its shift position between the differential-locked and differential-free drive modes of operation is disposed on the side opposite to the side on which the subordinate variable speed gear assembly. Such a layout also provides the advantage of shortening the length of the shaft of the transfer unit.

BRIEF DESCRIPTION OF THE DRAWINGS

The foregoing and other objects, features and advantages of the present invention will be understood more clearly and fully from the detailed description of the preferred embodiments which follows, with reference to the accompanying drawings wherein similar parts and elements are designated by the same reference numerals and symbols.

FIG. 5 represents the relationship of shift positions with positions of an engagement pin engaged with a cam groove.

FIG. 19 is a flow chart showing a main routine of control of the second example according to the present invention.

FIGS. 20 to 22 are flow charts showing various operations shown in the main routine of FIG. 19, in which FIG. 20 is a flow chart showing an ordinary control operation, FIG. 21 is a flow chart showing a motor-rotation direction setting operation, and FIG. 22 is a flow chart showing a load value setting operation.

FIG. 23 is a table showing the relationship of the drive modes of operation with directions of the limit switches in accordance with the second example of the present invention.

FIG. 24 is a flow chart showing a motor control operation.

DETAILED DESCRIPTION OF THE PREFERRED EMBODIMENTS

Figure 1:
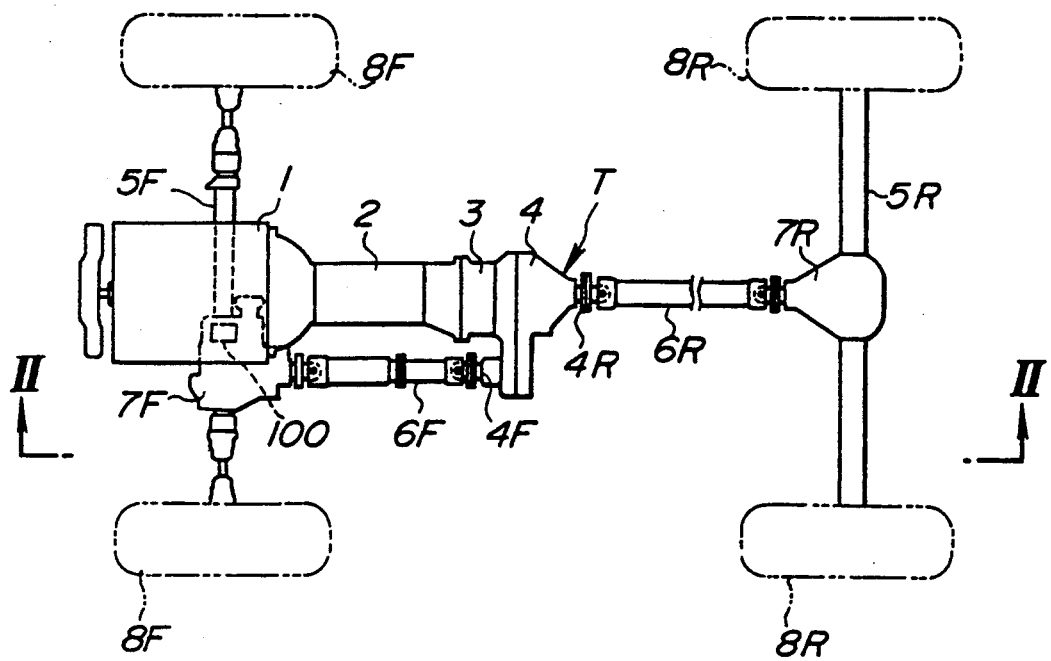
FIG. 1 is a schematic plan view showing a power train for a four-wheel drive vehicle embodying the present invention.

The present invention will be described in more detail by way of examples with reference to the accompanying drawings, wherein like reference numerals and alphanumerals designate corresponding or similar parts or elements throughout the several views.

First Example

Figure 2:
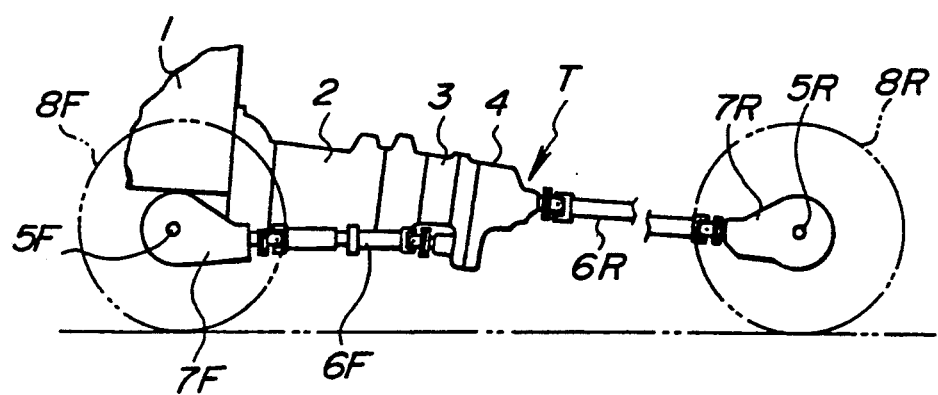
FIG. 2 is a schematic elevational view of the power train of FIG. 1.

FIGS. 1 and 2 generally show schematically a power train of a vehicle equipped with part-time four-wheel drive which has an engine unit 1, a main variable speed gear assembly 2 connected to the engine 1 through an engine clutch (not shown), a transfer case T including a transfer gear assembly 3 and a center-differential gear assembly 4 arranged in order from the front side of the vehicle. A rear wheel drive shaft or rear output shaft 4R of the center-differential gear assembly 4 is coupled to a rear axle shaft 5R through a rear propeller shaft 6R and a rear axle differential case 7R by which a pair of rear wheels 8R are turned differentially. A front wheel drive shaft or front output shaft 4F of the center-differential gear assembly 4, which is laterally spaced from and located in parallel with the rear output shaft 4R, is coupled to a front axle shaft 5F through a front propeller shaft 6F and a front axle differential case 7F by which a pair of front wheels 8F are turned differentially. As is known to those skilled in the art, each propeller shaft 6R, 6F is coupled at its both ends to the output shaft 4R, 4F and the axle differential case 7R, 7F by means of universal joints.

The transfer gear assembly 3 comprises a shift device as 2-4 shift means for shifting from a two-wheel (2W) drive to a four-wheel (4W) drive mode of operation or vice versa. The shift device is connected to a center-differential gear assembly 4 for shifting between a center differential-locked and a center differential-free drive mode of operation.

Figure 3:
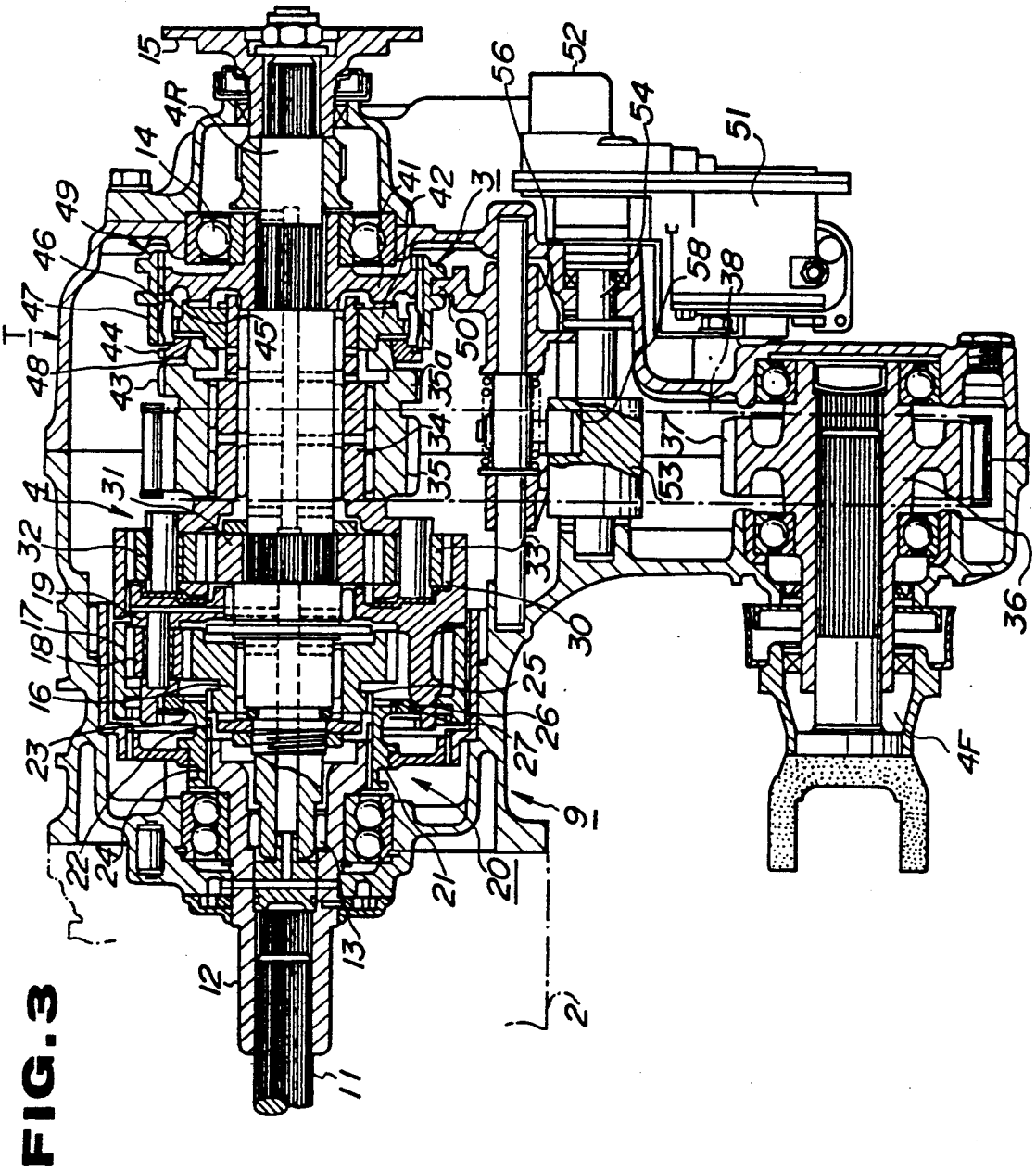
FIG. 3 is a sectional view showing the power train to which the first example of the present invention is applied.

FIG. 3 shows a detail of the transfer gear assembly 3, the center differential gear assembly 4, and so on. As shown in FIG. 3, reference numeral 9 denotes a subordinate variable speed gear assembly to which a driving force of the engine main body 1 is generated through the main variable speed gear assembly 2. More specifically, the rear output shaft 4R of the subordinate variable speed gear assembly 9 and the transfer gear assembly 3 is coaxially connected to an output shaft of the main variable speed gear assembly 2, namely an input shaft 11 of the subordinate variable speed gear assembly 9 and the transfer gear assembly 3. A forward end portion of the rear output shaft 4R is supported by a needle bearing 13 so as to be rotatable relative to the input shaft 11, the needle bearing 13 being interposed between an inner peripheral surface of a flange member 12 of the input shaft 11 and an outer peripheral surface of the forward end portion of the rear output shaft 4R. A rearward end portion of the rear output shaft 4R is supported rotatably by the transfer case T through a bearing 14. To the rearward end portion of the rear output shaft 4R is fixed a flange fitting 15 which is disposed so as to project rearwardly from the transfer case T, and a propeller shaft 6R for rear wheels is connected to the flange fitting 15.

The subordinate variable speed gear assembly 9 is composed of a planetary gear mechanism which comprises a sun gear 16, a ring gear 17, a plurality of pinion gears 18 in mesh with the sun gear 16 and the ring gear 17, and a carrier 19 supporting the pinion gears 18 and connected integrally to the rear output shaft 4R.

Disposed between the rear output shaft 4R and the input shaft 11 is a shift mechanism 20 which comprises a sleeve 21, and the shifting is implemented by displacing the sleeve 21 in an axial direction. More specifically, the sleeve 21 is provided at its inner peripheral surface with a first spline 22 and at its outer peripheral surface with a second spline 23, the first spline 22 being in mesh with a spline 24 of the flange member 12 and with a spline 25 of the sun gear 16 and the second spline 23 being in mesh with a spline 27 of a ring member 26 mounted integrally with the carrier 19. The sleeve 21 is transferred under pressures in the axial direction by means of a power train shifting mechanism (not shown) so as to be selectively connected to the input shaft 11 and the sun gear 16 through the sleeve 21 by selectively engaging the sun gear 16 or the ring member 26 therewith, thereby selectively shifting between a high speed and a low speed drive mode of operation.

Rearward of the subordinate variable speed gear assembly 9 is disposed the center differential gear assembly 4 which comprises a planetary gear mechanism. More specifically, the center differential gear assembly 4 comprises a ring gear 30 formed integrally with the carrier 19, a sun gear 31 formed integrally with the rear output shaft 4R, a pinion gear 32 for engaging the ring gear 30 and the sun gear 31, and a carrier 33 for rotatably supporting the pinion gear 32. At a position rearward of the center differential gear assembly 4, a sprocket 35 is outwardly engaged so as to be rotatable relative to the rear output shaft 4R through a bearing sleeve 34 integral with the carrier 33, and a chain 38 is wound between the sprocket 35 and a follower sprocket 37 formed integrally with the front output shaft 4F for front wheels. Disposed rearward of the sprocket 35 is the transfer gear assembly 3 which has a synchronized engagement device 49 comprising a gear 41 engaged so as to be rotatable integrally with the rear output shaft 4R, a clutch hub 42 rotatable integrally with the sleeve 34, an extension (clutch ring) 35a of the sprocket 35 adjacent to the clutch hub 42, a sleeve 47 with a spline 46 engageable with splines 43, 44, and 45, each being formed on an outer periphery thereof, and a synchronizer ring 48 interposed between the sleeve 47 and the sprocket 35. The transfer gear assembly 3 shifts the power train by transferring the sleeve 47 in the axial direction under pressures by a shift fork 50, thereby selectively providing a two-wheel drive mode of operation, a four-wheel differential-locked drive mode of operation, and a four-wheel differential-free drive mode of operation.

More specifically, the transfer gear assembly 3 shifts between a two-wheel (2W) drive mode and a four-wheel (4W) drive mode of operation by means of an electric motor 51 (actuator) of high power, as well as between a differential-locked drive mode and a differential-free drive mode of operation.

The electric motor 51 rotates a shift rod 54 with a cam member 53 through a decelerator 52. Disposed in parallel to the shift rod 54 is a supporting rod 55, and a movable sleeve 56 with the fork 50 is to be inserted into the supporting rod 55 in a stroke in the axial direction. Projecting from the movable sleeve 56 is an engagement pin 57 which is engageable with a cam groove 58 of the cam member 53.

Rotation of the electric motor 51 transfers the sleeve 47 engaged with the fork 50 through the shift rod 54, the cam member 53, and the movable sleeve 56 (engagement pin 57), thereby permitting a shift between a two-wheel drive mode of operation and a four-wheel drive mode of operation. More specifically, the cam groove 58 of the cam member 53 is formed as shown in FIG. 5. As shown by the solid line in FIG. 5, when the engagement pin 57 is located at an intermediate position of the cam groove 58, it is in a four-wheel differential-locked drive mode of operation. As the engagement pin 57 is located at one of stroke ends of the cam groove 58 as shown by the broken line, on the one hand, it is in a two-wheel drive mode of operation. As the engagement pin 57 is located at the other end of the stroke end of the cam groove 58 as shown by the dot-dash line in FIG. 5, on the other hand, it is in a four-wheel differential-free drive mode of operation. As has been described hereinabove, the stroke end positions as a first position are two positions at which it is in a two-wheel drive mode of operation and in a four-wheel differential-free drive mode of operation, respectively, while a shift position other than the stroke end positions, as a second position, is the position at which it is in a four-wheel differential-locked drive mode of operation.

The relationship of the sleeve 47 with each of drive modes of operation will be described in more detail with reference to FIGS. 4A to 4C.

Figure 4A:
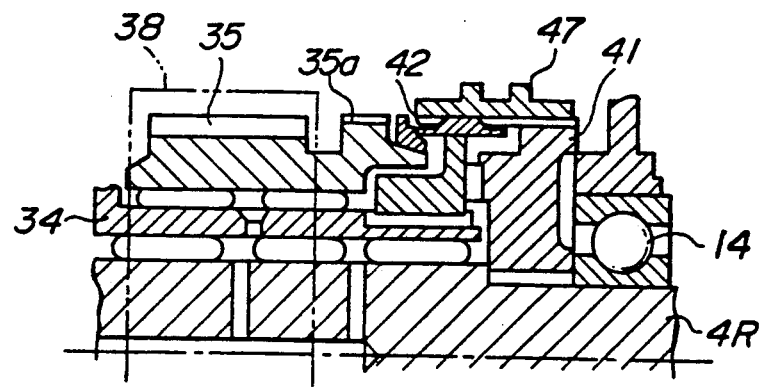
FIGS. 4A and 4B are sectional views showing details of FIG. 3 which are in the two-wheel drive mode of operation, a four-wheel differential-locked drive mode of operation, and a four-wheel differential-free drive mode of operation, respectively.

FIG. 4A shows a two-wheel drive mode of operation. As shown in FIG. 4A, the sleeve 47 is in engagement with the rings 41 and 42 while it is in disengagement over the clutch ring 35a. Under this two-wheel drive mode of operation, the sun gear 31 and the pinion gears 32 of the center differential gear assembly 4 are locked together, transmitting driving torque from the ring gear 30 of the center differential gear assembly 4 directly to the rear output shaft 4R.

Figure 4B:
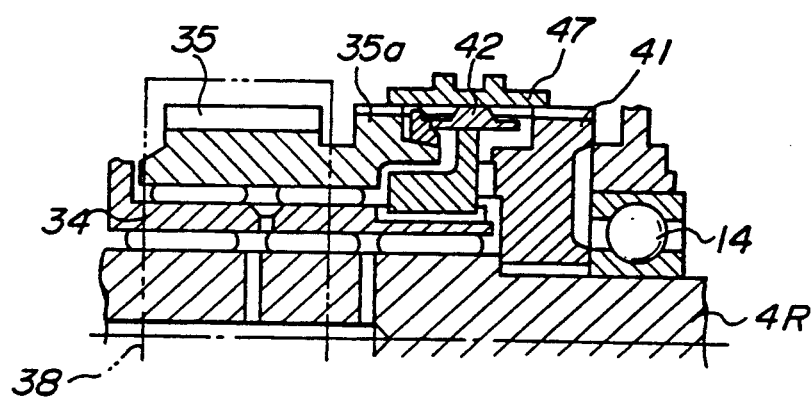

FIG. 4B shows a four-wheel differential-locked drive mode of operation. As shown in FIG. 4B, the sleeve 47 is placed in engagement with the rings 41, 42 and 35a. Under this four-wheel differential-locked drive mode of operation, the sleeve 34 and the sprocket 35 are locked together to maintain the center-differential gear assembly 4 in the four-wheel drive mode of operation. Simultaneously, since the rear output shaft 4R and the sleeve 34 are locked together, the center-differential gear assembly 4 is shifted into the four-wheel differential-locked drive mode of operation.

Figure 4C:
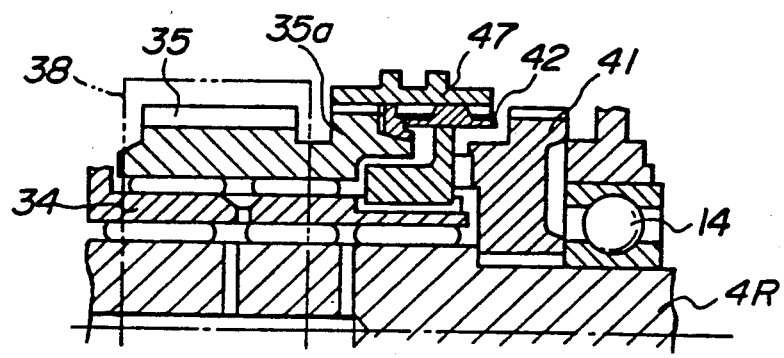

FIG. 4C shows a four-wheel differential-free drive mode of operation. As shown in FIG. 4C, the sleeve 47 is brought into spline engagement with the clutch rings 42 and 35a but out of engagement over the ring 41. Therefore, the sleeve 34 and the sprocket 35 are locked together through the clutch rings 42 and 35a to shift the center-differential gear assembly 4 into the four-wheel differential-free drive mode of operation. As a result, the center-differential gear assembly 4 allows the front and rear output shafts 4F and 4R to turn at different speeds when negotiating a turn.

Figure 6:
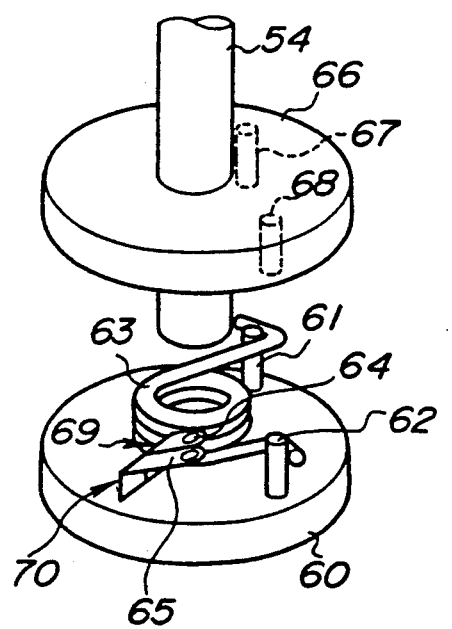
FIG. 6 is a perspective view showing one example of a load detecting means.

Referring to FIG. 6, the electric motor 51 drives a gear 60 from which a pair of engagement pins 61 and 62 are projecting, and they are engaged with each end of a spiral spring 63 and provided with first and second contact terminals 64 and 65, respectively. The shift rod 54 is connected to a gear 66 which is provided with a pair of engagement pins 67 and 68, each being engaged with the spiral spring 63, and with a circuit base plate 71 (an area indicated by oblique lines in FIG. 8) for forming the contact terminals 64 and 65 as well as a first limit switch 69 and a second limit switch 70.

Figure 7:
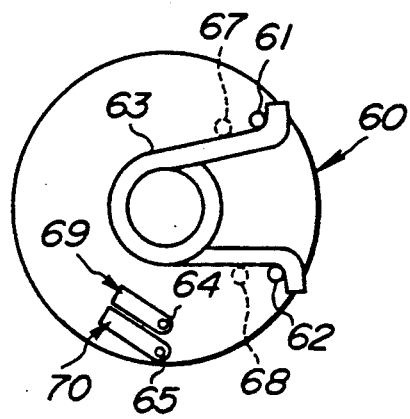
FIG. 7 is a plan view showing one of members of the load detecting means of FIG. 6.
Figure 8:
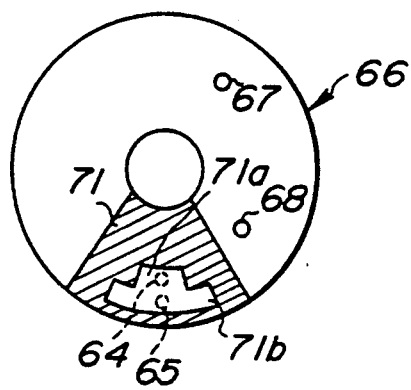
FIG. 8 is a plan view showing the other of members of the load detecting means of FIG. 6.
Figure 9:
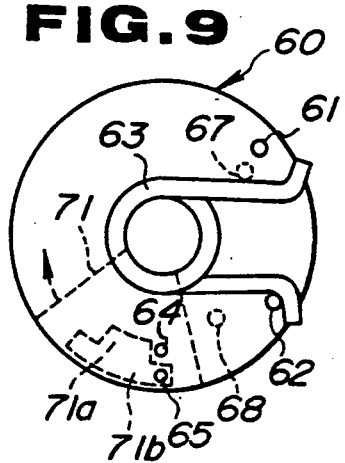
FIG. 9 represents a state in which an overload is added to the motor, corresponding to FIG. 8.

Turning now to FIGS. 7 to 9, the circuit base plate 71 contains a first non-circuit section 71a of a shorter size and a second non-circuit section 71b of a longer size. The position of the first non-circuit section 71a is disposed so as to correspond to the position of the first contact terminal 64 while the position of the second non-circuit section 71b is associated with the position of the second contact terminal 65. FIGS. 8 and 9 show the relationship of the relative positions of the gears 60 and 66. In a state in which no external force is acting on the gears 60 and 66, each of the first and second contact terminals 64 and 65 is located on the first non-circuit section 71a or the second non-circuit section 71b, thereby allowing the limit switches 69 and 70 to be in an OFF state. For instance, when the gears 60 and 66 are rotated relative to each other—for example, when the gear 66 is rotated relative to the gear 60 in a clockwise direction in FIG. 9—an amount of relative rotation gets larger as force for releasing the spiral spring 63 gets larger. As the amount of relative rotation, namely, an amount of the spiral spring 63 released, reaches a first given value, the first contact terminal 64 is disengaged from the first non-circuit section 71a, as shown in FIG. 9, thereby turning the first limit switch 69 on. The second contact terminal 65 is still engaged with the second non-circuit section 71b, so that the second limit switch 70 is kept from being turned off. As the amount of relative rotation gets further larger, the second contact terminal 65 is then disengaged from the second non-circuit section 71b and both the limit switches 69 and 70 are turned on. A load to the motor 51 when the first limit switch 69 starts turning on becomes a first load value (smaller) while a load to the motor 51 when the second limit switch 70 starts turning on becomes a second load value (larger). In this embodiment, the first load value is set to 40 kg and the second load value is set to 80 kg. It is to be noted, however, that the same thing can be applied when a relative direction of rotation of the gears 60 and 66 is opposite to the above case.

Although the gears 60 and 66 may be incorporated at appropriate positions of a passage connecting the motor 51 to the sleeve 47, it is preferred that they may be disposed at positions as close as possible to the motor 51 in the direction of power transmission of the motor 51, thereby improving accuracy of a load state to the motor 51.

Figure 10:
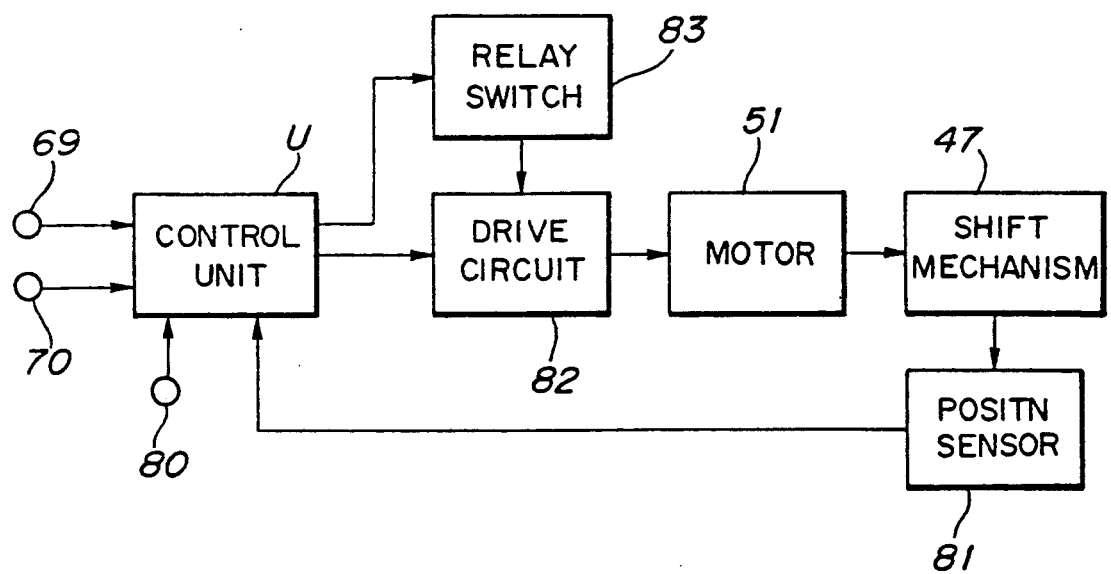
FIG. 10 is a block diagram showing a control system of the motor.

Referring now to FIG. 10, reference symbol U denotes a control unit consisting of a microcomputer. The control unit U receives signals from the limit switches 69 and 70, from a switch 80 for selecting an instruction of shifting a power train to be manually operable by an operator, and from a position sensor 81 for detecting the current shift position of the sleeve 47. The control unit U generates output to a relay switch 83 in order to open or close a driving circuit 82 of the motor 51 and an electric source circuit of the motor 51.

The control unit U basically controls the driving circuit 82 so as to take a shift position selected by a manual switch 80. When the shift position selected by a position switch 81 is confirmed by a position sensor 81, then the motor 51 is deenergized.

During the drive control of the motor 51, an addition of an overload to the motor 51 opens the relay switch 83 to forcibly deenergize the motor 51. At this time, a judgment as to whether or not the overload has been added is implemented by means of a value detected by either of the limit switch 69 or 70 in accordance with a mode of the shift position. More specifically, when the shift is implemented from the second position, namely, a four-wheel differential-locked (4WL) drive mode of operation, to the first position, namely, a two-wheel (2W) drive mode of operation or a four-wheel differential-free (4WF) drive mode of operation, on the one hand, there is used a value detected by the first limit switch 69 for detecting a smaller load. When the shift is implemented from the first position to the second position, there is a value detected by the second limit switch 70 for detecting a larger load.

Figure 11:
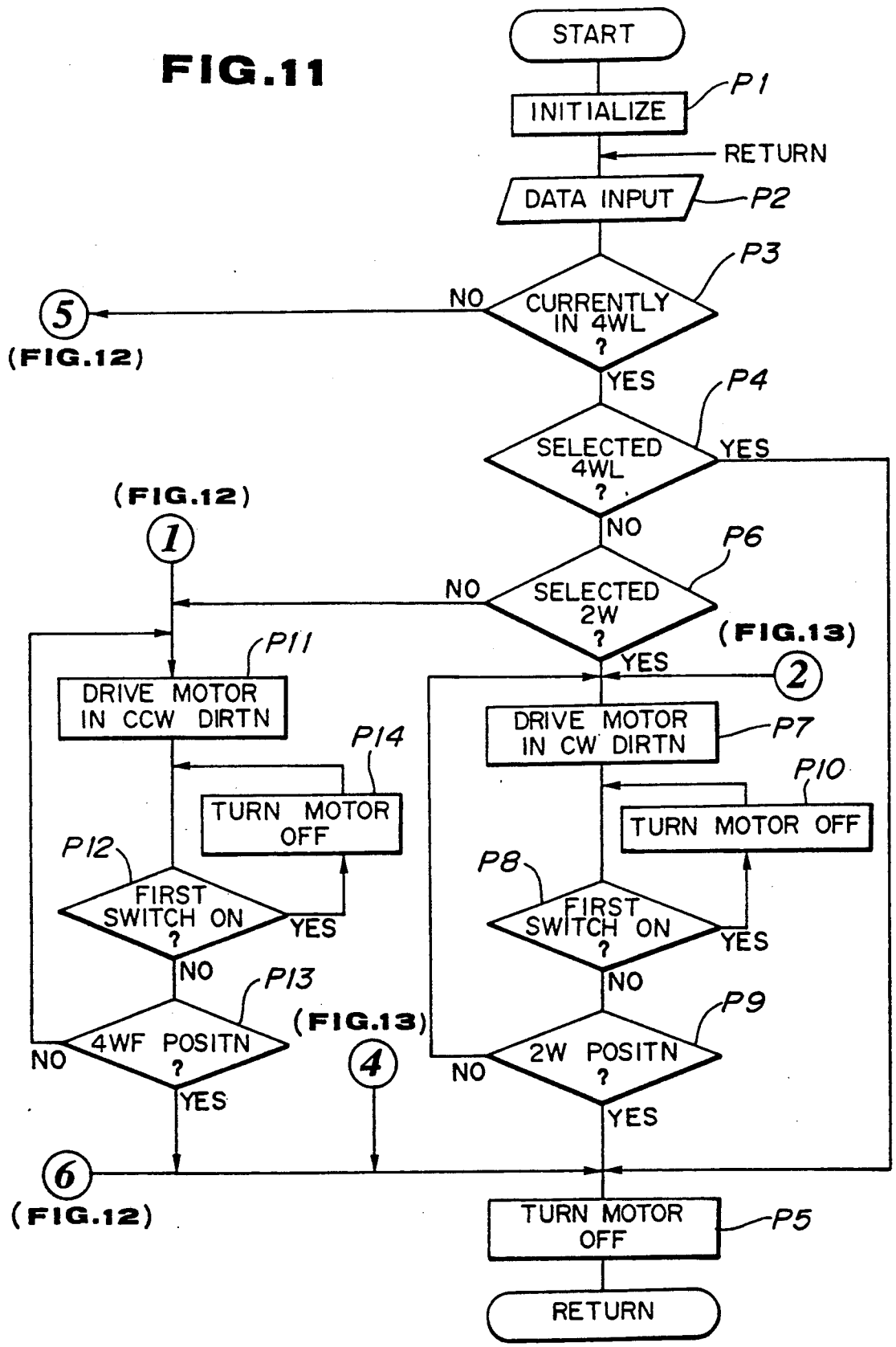
FIGS. 11 to 13 are flow charts showing a control example in accordance with the first example of the present invention.
Figure 12:
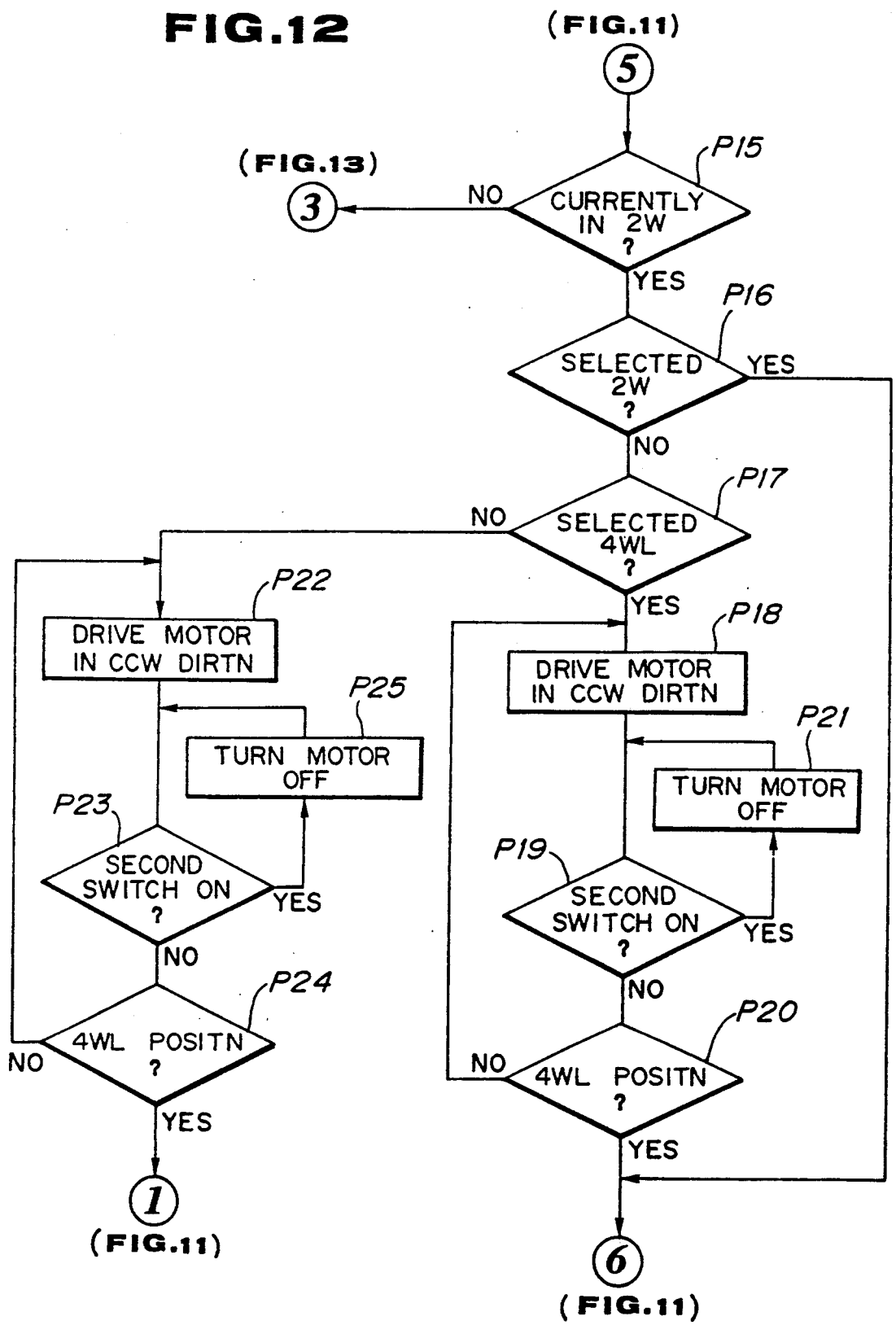
Figure 13:
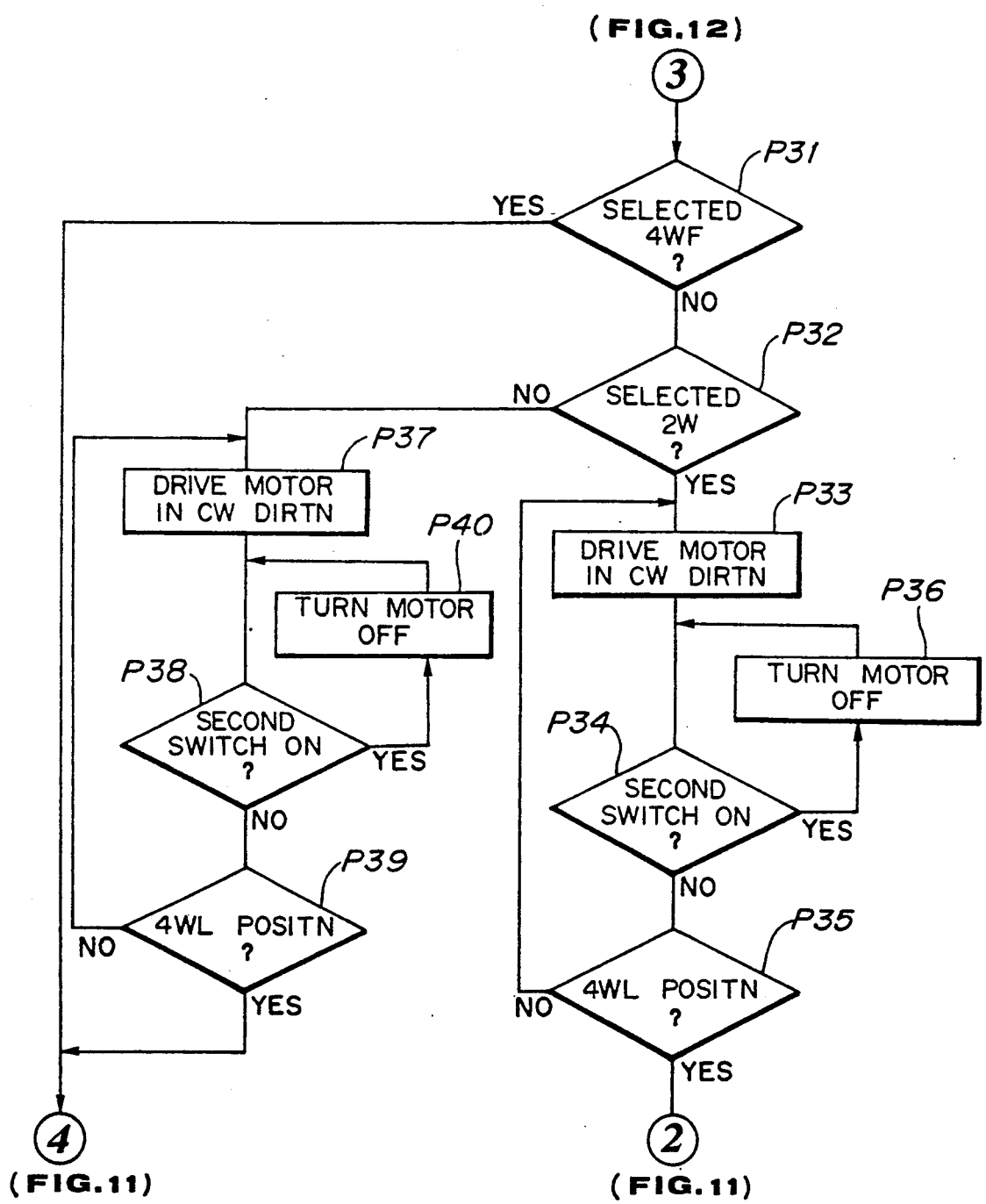

The control content by the control unit U will be described in more detail with reference to flow charts as shown in FIGS. 11 to 13. Further, the relationship of the direction in which the motor 51 is driven with the shift position as shown in FIG. 5.

After the whole system is initialized at step P1, the flow proceeds to step P2 and signals from switches 69, 70, and 80, or the sensor 81 are given.

Then at step P3, it is judged whether or not the current shift position is in a four-wheel differential-locked (4WL) drive mode of operation. If it is judged at step P3 that the shift position is currently in the 4WL drive mode of operation, it is further judged at step P4 whether or not the operator is currently selecting the 4WL drive mode of operation. If the operator is selecting the 4WL drive mode of operation, the shift position does not need to be changed so that the flow proceeds to step P5 where the motor 51 is deenergized by releasing the relay switch 83.

When it is judged at step P4 that the operator is not selecting the four-wheel differential-locked drive mode of operation, the flow proceeds to step P6 where it is further judged whether or not the shift position is in a two-wheel (2W) drive mode of operation. If the 2W drive mode of operation is selected at step P6, then the motor 51 is driven in the clockwise (CW) direction to shift the shift position from the four-wheel differential-locked to the two-wheel drive modes of operation at step P7. Then at step P8, it is judged whether or not a first switch 69 (limit switch) is turned on. If the first switch is not turned on, the flow goes to step P9 where it is further judged whether or not the current shift position is in the two-wheel (2W) drive mode of operation because no overload is acting at all on the motor 51 in this case. When the shift position is currently in the 2W drive mode of operation, it has already been shifted to a desired shift position so that the flow proceeds to step P5 where the motor 51 is deenergized. Then the flow is returned.

When it is judged at step P9 that the current shift position is not in the 2W drive mode of operation, then the flow returns to step P7 to drive the motor 51 in the clockwise (CW) direction, thereby shifting the current shift position to the two wheel (2W) drive mode of operation. Then the procedures of steps P8 and P9 are repeated. And when the first switch 69 is turned on, the flow goes to step P10 and the motor 51 is deenergized by releasing the relay switch 83. Thereafter, the flow is returned to step P8. While the steps P8 and P10 are circulated in the way as have been described hereinabove, an overload to the motor 51 is released until it was decided at step P8 that the first switch is OFF and the flow is finally transferred to step P9.

Turning back to step P6, when it is judged there that the two wheel drive mode of operation is not selected, the shift position is currently in the four-wheel differential-free drive mode of operation so that the flow proceeds to step P11 where the motor 51 is driven in the counterclockwise (CCW) direction. Then at step P12, it is judged whether or not the first switch 69 is turned on. When the first switch 69 is not judged to be turned on, the flow goes to step P13 where it is further judged whether or not the current shift position is in the four-wheel differential-free (4WF) drive mode of operation. When the decision is made at step P13 that the shift position is in the 4WF drive mode of operation, then the flow advances to step P5 where the motor 51 is deenergized followed by returning the flow.

At step P13, when it is judged that the shift position is not in the four-wheel differential-free (4WF) drive mode of operation, the motor 51 is driven in the CCW direction and then it is judged at step P12 whether the first switch is turned off. When the first switch is turned off and the shift position is in the 4WF drive mode of operation, the flow proceeds to step P5 where the motor 51 is deenergized and the flow is returned. If NO at step P13, then the procedures from steps P11 to P13 are repeated until it is judged at step P13 that the position is in the 4WF drive mode of operation.

Turning back to step P3, it is judged that the current position is not in the four-wheel differential-locked drive mode of operation, then the flow proceeds to step P15 in FIG. 12 where it is further judged whether or not it is currently in the two-wheel (2W) drive mode of operation. If the current shift position is in the two wheel drive mode of operation, then it is further judged at step P16 whether or not the 2 W drive mode of operation is selected. If YES at the judgment at step P16, it is not required that the shift position is changed so that the flow proceeds to step P5 in FIG. 11 where the motor 51 is deenergized and the flow is returned. If NO at step P16, it is further judged at step P17 whether or not the four-wheel differential-locked (4WL) drive mode of operation is selected. When it is judged at step P17 that the 4WL drive mode of operation is selected, the motor 51 is driven in the counterclockwise (CCW) direction at step P18 and then at step P19, it is then judged whether or not the second switch 70 is turned on. If NO, it is judged at step P20 whether or not the shift position is in the four-wheel differential-locked drive mode of operation. If it is judged YES at step P20, the flow proceeds to step 5 where the motor 51 is deenergized and then the flow is returned.

When it is judged at step P20 that the shift position is not in the 4WL drive mode of operation, the flow returns to step P18 where the motor 51 is turned in the CCW direction and then it is judged at step P19 whether or not the second switch 70 is turned on. If YES, the motor 51 is deenergized at step P21 and the flow returns again to step P19. The procedures from step P19 and step P21 are repeated until the judgment at step P19 is made NO. Then the flow proceeds to step P20. If YES at step P20, the motor 51 is deenergized at step P5 followed by turning the flow. If NO at step P20, then the flow is returned to step P18 and the procedures from step P18 to step P20 are repeated until the current position becomes in the four-wheel differential-locked drive mode of operation at step P20.

If it is judged at step P17 that the four-wheel differential-locked (4WL) drive mode of operation is not selected, the shift is required to be implemented from the two wheel (2W) to the four-wheel differential-free (4WF) drive mode of operation. Thus the flow proceeds to step P22 and the procedures from steps P22 to P24 are implemented in a way corresponding to the procedures from steps P7 to P10, respectively, in which step 23 is to detect the load by the second switch 70. The procedures from step P22 to step P25 shift the position from the four-wheel differential-locked (4WL) to the four-wheel differential-free (4WF) drive modes of operation and then the flow proceeds to step P11 in FIG. 11. Then the procedures from steps P11 to P14 are repeated to shift the shift position from the 4WL to the 4WF drive modes of operation by detecting the load by means of the first switch 69 at step P12.

When it is judged NO at step P15, it means that the current shift position is not in the two-wheel (2W) drive mode of operation. In this case, the flow proceeds to step P31 in FIG. 13 and it is further judged whether or not the four-wheel differential-free (4WF) drive mode of operation is selected. When the 4WF drive mode of operation is judged to be selected at step P31, it is not required that the shift position should be changed so that the flow proceeds to step P5 in FIG. 11 where the motor 51 is deenergized and then the flow is returned.

When the 4WF drive mode of operation is judged not to be selected at step P31, it is further judged at step 32 whether or not the two-wheel (2W) drive mode of operation is selected. If YES, then the procedures from steps P33 to P36 are implemented in which the load is detected by the second switch 69 at step P34, and the shift position is once shifted from the four-wheel differential-free (4WF) to the four-wheel differential-locked (4WL) drive modes of operation. Thereafter, the flow returns from step P35 to step P7 in FIG. 11 from which the procedures are repeated to step P10 in which the load is detected by the first switch 69 at step P8, whereby the shift position is shifted from the 4WL to the 2W drive modes of operation.

If it is judged at step P32 that the two wheel (2F) drive mode of operation is not to be selected, the four-wheel differential-locked (4WL) drive mode of operation is selected. In this case, the procedures from step P37 to step P40 are implemented in such a way as corresponding to the procedures from steps P7 to P10 in FIG. 11, whereby the shift position is changed to the 4WL drive mode of operation and the flow proceeds to step P5 where the motor 51 is deenergized and the flow is returned. Among the procedures from steps P37 to P40, it is provided, however, that the load is detected by the second switch 70 at step P38.

Second Example

Figure 14:
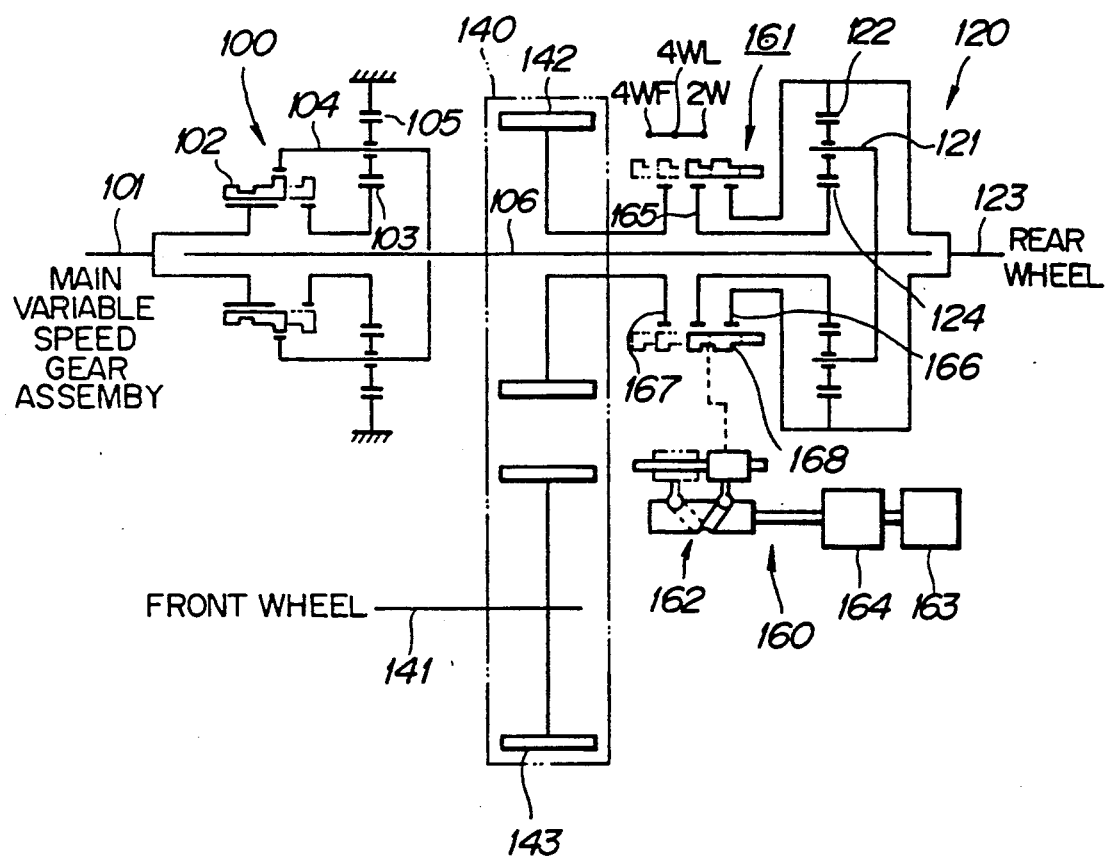
FIG. 14 is a skeleton view showing a power train to which the second example of the present invention is applied.

FIG. 14 represents a power train of a vehicle equipped with part-time four-wheel drive, which comprises a subordinate variable speed gear assembly 100, a center differential 120, a chain 140 for transmitting driving force to front wheels, interposed between the subordinate variable speed gear assembly 100 and the center differential 120, and a drive mode shift means 160 for shifting drive modes of operation.

As shown in FIG. 14, the subordinate variable speed gear assembly 100 comprises a planetary gear mechanism in which the output shaft 101 of a main variable speed gear assembly is selectively coupled to a sun gear 103 or a pinion carrier 104 through a shift sleeve 102. To the output shaft 101 is coupled a ring gear 105 of the planetary gear mechanism, and the pinion carrier 104 is coupled to an intermediate shaft 106 that transmits power to the center differential 120. When the output shaft 101 of the main variable speed gear assembly is coupled to the pinion carrier 104 as indicated by the solid line in FIG. 14, the subordinate variable speed gear assembly 100 having the structure as has been described hereinabove forms a high speed mode in which rotation of the output shaft 101 is transmitted to the intermediate shaft 106. When the output shaft 101 of the main variable speed gear assembly is coupled to the sun gear 103, the subordinate variable speed gear assembly 100 forms a low speed mode in which rotation of the output shaft 101 is decelerated and transmitted to the intermediate shaft 106.

The center differential 120 is constituted by the planetary gear mechanism in which the intermediate shaft 106 is coupled to a pinion carrier 121 of the planetary gear mechanism and a ring gear 122 is coupled to an output shaft 123 (hereinafter referred to as a first output shaft) for generating power to the rear wheels. A sun gear 124 of the center differential 120 is coupled to an output shaft 141 for front wheels (hereinafter referred to as a second output shaft) through a clutch mechanism 161 constituting the shift means 160 and through a sprocket 142 on the side of the driven wheels, a chain 140 and a sprocket 143 on the side of the undriven wheels, which constitute a chain-type transmitting mechanism interposed between the intermediate shaft 106 and the second output shaft 141.

The shift means 160 comprises the clutch mechanism 161, an operation mechanism 162 for operating the clutch mechanism 161, a motor 163 as an actuator, and load value detecting means 164 for detecting a load to be applied to the motor 163, which includes a load value shifting means.

Figure 15:
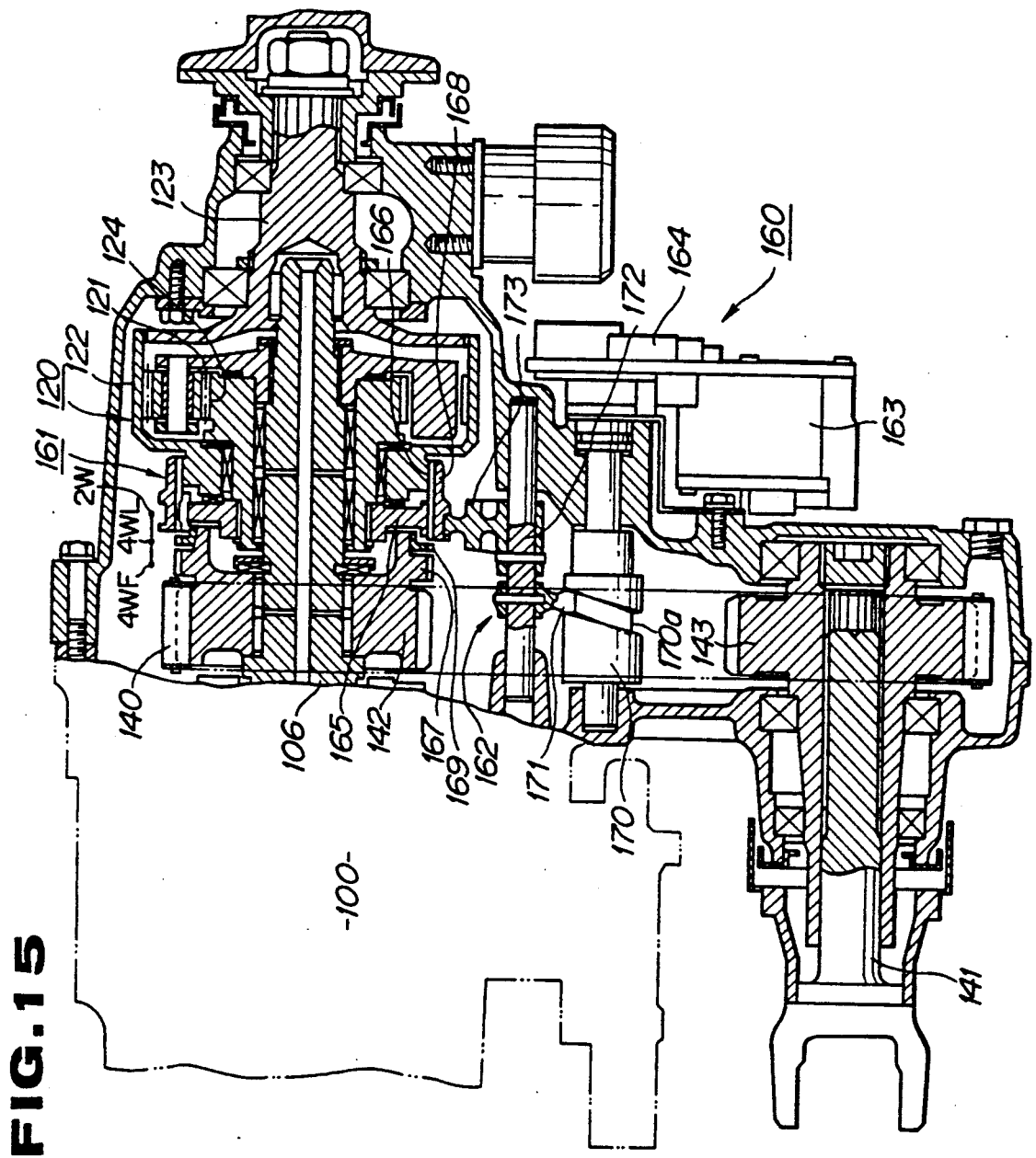
FIG. 15 represents a detail of FIG. 14.

FIG. 15 represents a detail of the shift means 160. The shift means 160 comprises a clutch hub 165 connected to an extension of the sun gear 124 in the center differential 120, a first clutch gear 166 disposed integrally with the ring gear 122, a second clutch gear 167 disposed integrally with the sprocket 142 on the side of the driven wheels of the chain-type transmitting mechanism, and a shift sleeve 168 which is slidably spline-engaged between the first and second clutch gears 166 and 167, respectively. In this embodiment, a synchronizer ring 169 for synchronizing the rotation of the clutch hub 165 and the second clutch gear 167 is interposed therebetween.

The relationship of the positions of the shift sleeve 168 in the clutch mechanism 161 with the power transmission now will be described in more detail hereinafter. As the shift sleeve 168 is located to the lefthand stroke end in the drawing, the clutch hub 165 is coupled to the second clutch gear 167 and the sun gear 124 of the center differential 120 is coupled to the sprocket 142, on the rear wheel side, of the transmitting mechanism. This arrangement permits the sun gear 124 as one output element to be coupled to the front wheels from the second output shaft 141 while the ring gear 122 as another output element to be coupled to the rear wheels from the first output shaft 123. This provides a four-wheel drive mode of operation in which power to be transmitted from the pinion carrier 121 is transmitted each to the front and rear wheels and allows the sun gear 124 and the ring gear 122 to be rotated relative to each other, thereby enabling a four-wheel differential-free (4WF) drive mode of operation which can produce a difference of rotational speeds between the front and rear wheels.

At an intermediate stroke position at which the shift sleeve 168 slides by a given amount to the right in the drawing, the shift sleeve 168 allows the first clutch gear 166 to be coupled to the second clutch gear 167 through the clutch hub 165 interposed therebetween. In this state, power transmitted to the pinion carrier 121 of the center differential 120 is outputted each to the front wheel side from the sun gear 124 and to the rear wheel side from the ring gear 122, thereby forming a four-wheel drive mode of operation in which all the front and rear wheels are driven. On the other hand, the sun gear 124 is coupled to the ring gear 122, whereby a differential operation of the ring gear 122 and the sun gear 124 is blocked and there is provided a four-wheel differential-locked (4WL) drive mode of operation in which the front and rear wheels are driven in a uniform manner.

As the shift sleeve 168 slides to the right in the drawing and located at the righthand stroke end position as indicated by the solid line in FIGS. 14 and 15, the shift sleeve 168 is brought into engagement with the clutch hub 165 and the first clutch gear 166 with the latter disposed astride, thereby uncoupling the synchronizer ring 169 and the second clutch gear 167. This arrangement enables transmission of power from the center differential 120 to the second output shaft 141 while the center differential 120 is being locked, thereby providing a two-wheel (2W) drive mode of operation in which power is transmitted to the rear wheel side only.

The operation mechanism 162 for operating the clutch mechanism 161 comprises a cylindrical cam 170 rotatable by the motor 163 through the load detecting mechanism 164, a shift rod 172 having a cam follower 171 engaged with a cam groove 170a of the cam 170, and a shift fork 173 engaged with the shift sleeve 168 of the clutch mechanism 161, fixed to the shift rod 172. Rotation of the cylindrical cam 170 by the motor 163 allows the shift sleeve 168 to slide in a region ranging between the lefthand and righthand stroke end positions through the intermediate position by means of the shift rod 172 and the shift fork 173.

Figure 16:
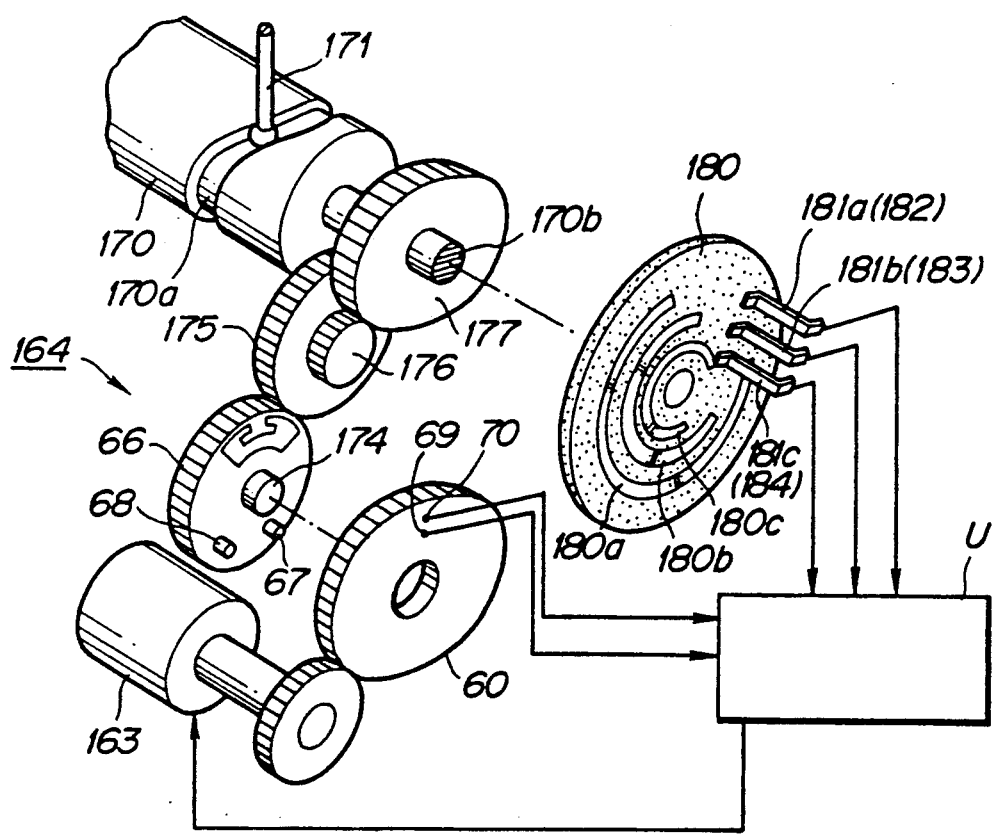
FIG. 16 is a perspective view showing the load detecting means and position switches.

The load detecting mechanism 164 (including the load value shifting means) will then be described with reference to FIG. 16. The load detecting mechanism 164 is provided with the limit switches 69 and 70 in substantially the same manner as in the first example above. More specifically, the load detecting mechanism 164 comprises the gear 60 rotatable by the motor 163 and the gear 66 disposed coaxially about a shaft 174 so as to be rotatable relative to each other. The gear 66 is coupled to a gear 177 fixed to a rotary shaft 170b of the cylindrical cam 170 through a decelerating gear 175. In FIG. 16, a spiral spring 63 and other elements to be interposed between the gears 60 and 66 are omitted for brevity of representation. It is further to be noted that the limit switches 69 and 70 have substantially the same functions as those used in the first example above. In other words, a load to the motor 103 is set to 40 kg when the first limit switch 69 starts turning ON and a load to the motor 163 is set to 80 kg when the second limit switch 70 starts turning ON.

Figures 17, 18:
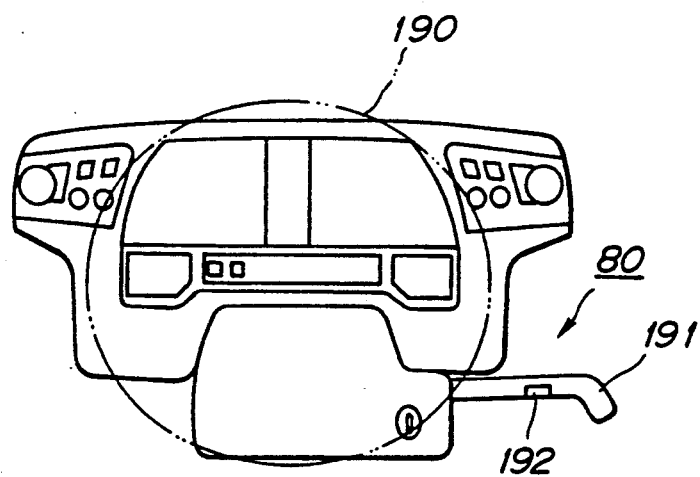
FIG. 17 is a table showing operation of the position switches.
FIG. 18 is a front view showing an operational lever on the operator's compartment.

Referring further to FIG. 16, the rotary shaft 170b of the cylindrical cam 170 is mounted with a circular plate 180 on which three conductive plates 180a, 180b and 180c, each being in an arcuate form, are attached in a spaced relationship in a radical direction and three brushes 181a, 181b and 181c, respectively. They form first, second and third position switches 182, 183 and 184, respectively, for detecting an angle of rotation of the cylindrical cam 170, namely, the position of the shift sleeve 168 in the clutch mechanism 161. As shown in FIG. 17, the position switches 182, 183 and 184 enables a detection of the positions of the shift sleeve 168, by a combination of the ON and OFF states of the position switches, at which the shift sleeve 168 is located, namely, a 2W position that is the righthand stroke end position, a 4WL position that is the center stroke position, a 4WF position that is the lefthand stroke end position, a first intermediate position α between the 2W and the 4WL positions, and a second intermediate position β between the 4WL and the 4WF positions.

An overall structure of the control system according to this example is basically the same as the first example as shown in FIG. 10 so that a detail description on a manual switch 80 has been omitted from the description on the first example. As shown in FIG. 18, the manual switch 80 comprises a lever 191 disposed in the vicinity of a steering wheel 190 disposed in the front of an operator's compartment, and a push button 192 disposed on the lever 191. The lever 191 is to shift the position between two wheel and four wheel drive modes of operation, which functions as a 2-4 shift switch. The push button 192 is to shift the center differential 120 between the center differential-locked and the center differential-free drive modes of operation, thereby functioning as a center-differential shift switch. Speed ranges of the subordinate variable speed gear assembly 100 can be shifted in the four wheel drive mode of operation by operation of the lever 191.

The shift control by a control unit U will now be described with reference to FIG. 19.

FIG. 19 represents a main routine of this shift control. First at step S1, the control unit U initializes the given system. Then at step S2, output signals are inputted from the first, second and third position switches 182, 183 and 184. Thereafter, at step S3, a combination of the ON/OFF states of the position switches indicated by the input signals is compared with the combination of the ON/OFF states of the position switches set in advance as shown in FIG. 17 and it is then judged that an actual combination of the position switches 182, 183 and 184 is out of order if the actual combination does not correspond to any of the combinations set as shown in FIG. 17. In this case, the flow proceeds to step S4, control over the position switch break-down mode is executed.

When the signal from the 2-4 shift switch 191 indicates a shift from the two-wheel to the four-wheel drive modes of operation, a synchronized state between the clutch hub 165 and the second clutch gear 167 in the clutch mechanism 161 is detected at step S5. Then at step S6, it is judged whether or not the synchronization operation is implemented in a normal state. When the synchronization operation is not judged to be normal, on the one hand, the flow then proceeds to step S7 and the synchronization default mode is implemented.

When it is judged at step S6 that the synchronization operation is implemented in a normal way, on the other hand, then the ordinary shift control is carried out at step S8.

The ordinary shift control S8 in FIG. 19 is carried out in accordance with the flow chart as shown in FIG. 20. In the ordinary shift control, the current position of the shift sleeve 186 is judged by means of the signals from the position switch 192 at step S11, and a target position for realizing a drive mode selected by the operator by means of the signals from the 2-4 shift switch 191 and the center differential shift switch 192 is judged at step S12.

Figure 21:
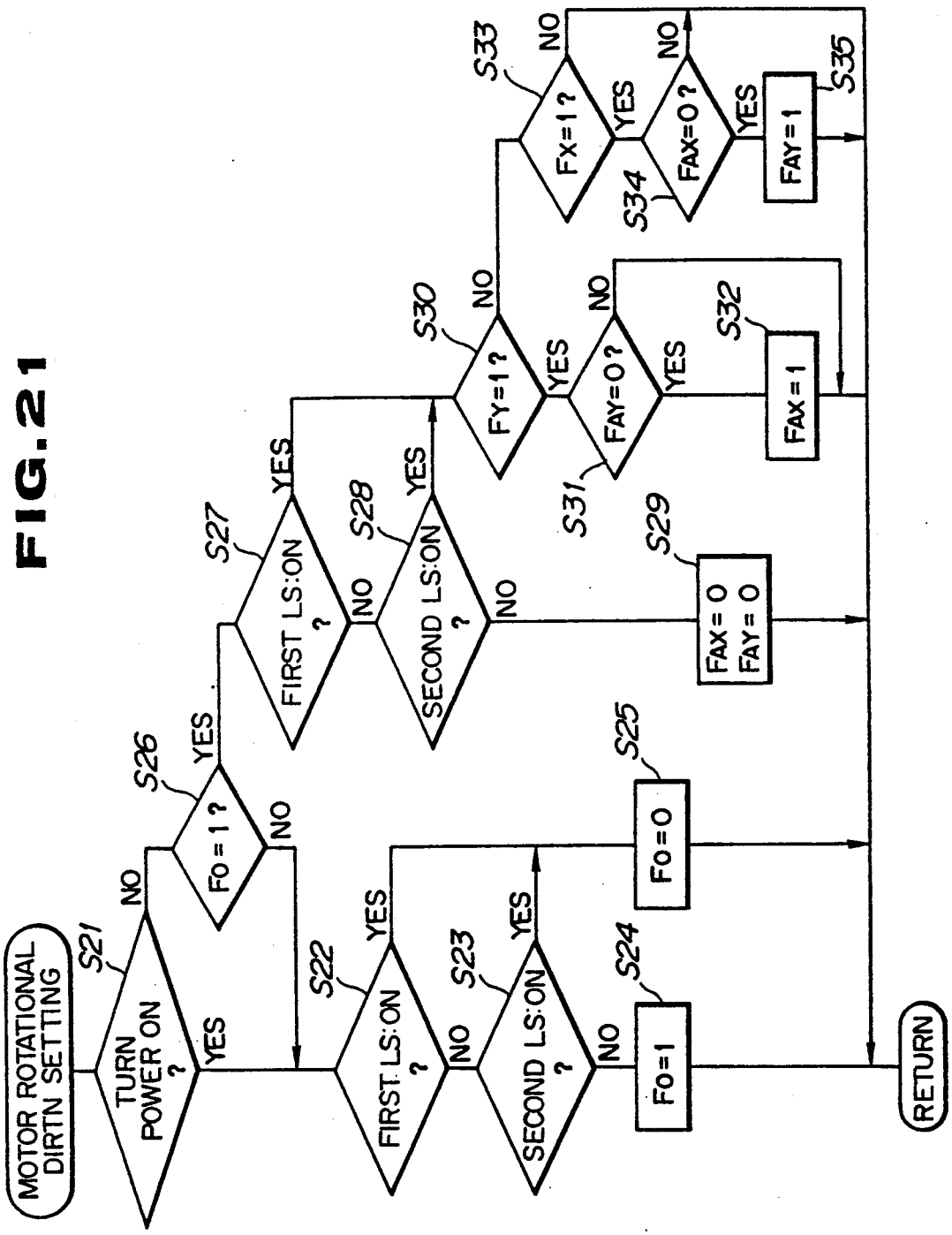

Then at step S13, a direction of rotation of the motor 163 in the shift means 160 is set and, at step S14, an acceptable load for deenergizing the motor 163 is set. Then the flow proceeds to step S15 where the motor 163 is subjected to the drive control so as to allow it to provide the direction and the load value obtained by those setting operations. The setting of the direction of rotation of the motor 163 may be implemented in accordance with the flow chart as shown in FIG. 21.

First at step S21, whether or not power was energized immediately before is judged. When it is judged that the power was energized immediately thereafter, then it is judged at steps S22 and S23 whether or not the first and second limit switches 69 and 70 are in an ON state, respectively. If the first and second limit switches 69 and 70 are being turned OFF, and execution flag Fo is set to 1 as step S24. If it is judged at steps S22 and S23 that either of the first limit switch 69 or the second limit switch 70 is being turned ON, the flow proceeds to step S25 in each case and the execution flag Fo is set to 0. Then the flow is returned.

If NO at step S21, the flow proceeds to step S26 where a value of the execution flag Fo is judged and, when the execution flag Fo is not judged at step S26 to be set to 1, then the flow goes back to step S22 followed by the procedures from step S22 to step S25.

If it is judged at step S26 that the execution flag Fo is set to 1, then the flow proceeds to step S27 where the first limit switch 69 is judged to be in an ON state. If No at step S27, then it is judged at step S28 whether or not the second limit switch 70 is being turned ON. When both of the first and second limit switches 69 and 70 are turned OFF, the flow proceeds to step S29 where an X-direction rotation accepting flag $F_{AX}$ and an Y-direction rotation accepting flag $F_{AY}$ are reset to 0 in each case. It is noted herein that the X-direction means the direction in which the shift sleeve 168 in the clutch mechanism 161 as shown in FIG. 15 slides from the right side to the left side in the drawing, namely, from the 2 W position through the 4 WL position to the 4 WF position while the Y-direction means the direction in which the shift sleeve 168 slides in the opposite way from the left side to the right side in the drawing, namely, from the 4 WF position through the 4 WL position to the 2 W position.

If at least either of the first or second limit switch 69 or 70 is in an On state, the flow proceeds from step S27 or from step S28 to step P30. At step S30, a value of an Y-direction rotation flag $F_Y$, indicative of rotation of the motor 163 in the Y-direction, is judged. If this value is judged to be $F_Y=1$, that is, when the motor 163 is currently rotated in the Y-direction, the Y-direction rotation accepting flag $F_{AY}$ is confirmed at step S31 to be set to 0 and then the X-direction rotation accepting flag $F_{AX}$ is set to 1 at step S32. If $F_Y$ is judged to be set to 0 at step S30, the flow then proceeds to step S33 and a value of the X-direction rotation flag $F_X$ is judged, a flag being indicative of rotation of the motor 163 in the X-direction. When it is judged to be $F_X=1$, that is, when the motor 163 is currently rotated in the X-direction, that the X-direction rotation accepting flag $F_{AX}$ is set to 0 is confirmed at step S34 and, then at step S35, the Y-direction rotation accepting flag $F_{AY}$ is set to 1.

As have been described hereinabove, when at least one of the first and second limit switches 69 and 70 is turned ON in a state in which the motor 163 is rotated in either of the X-direction or Y-direction, the rotation accepting flag $F_{AX}$ of $F_{AY}$ in the direction opposite to the direction, in which the motor 163 is currently rotated, is set to 1, on condition that the rotation accepting flag $F_{AX}$ or $F_{AY}$ in the direction in which the motor 163 is currently rotated is reset to 0. This arrangement enables a rotation of the motor 163 in such a direction that turns the first and second limit switches 69 and 70 OFF, respectively, and prevents the rotation of the motor 163 from being rotated simultaneously in the both directions.

Figures 22, 23:
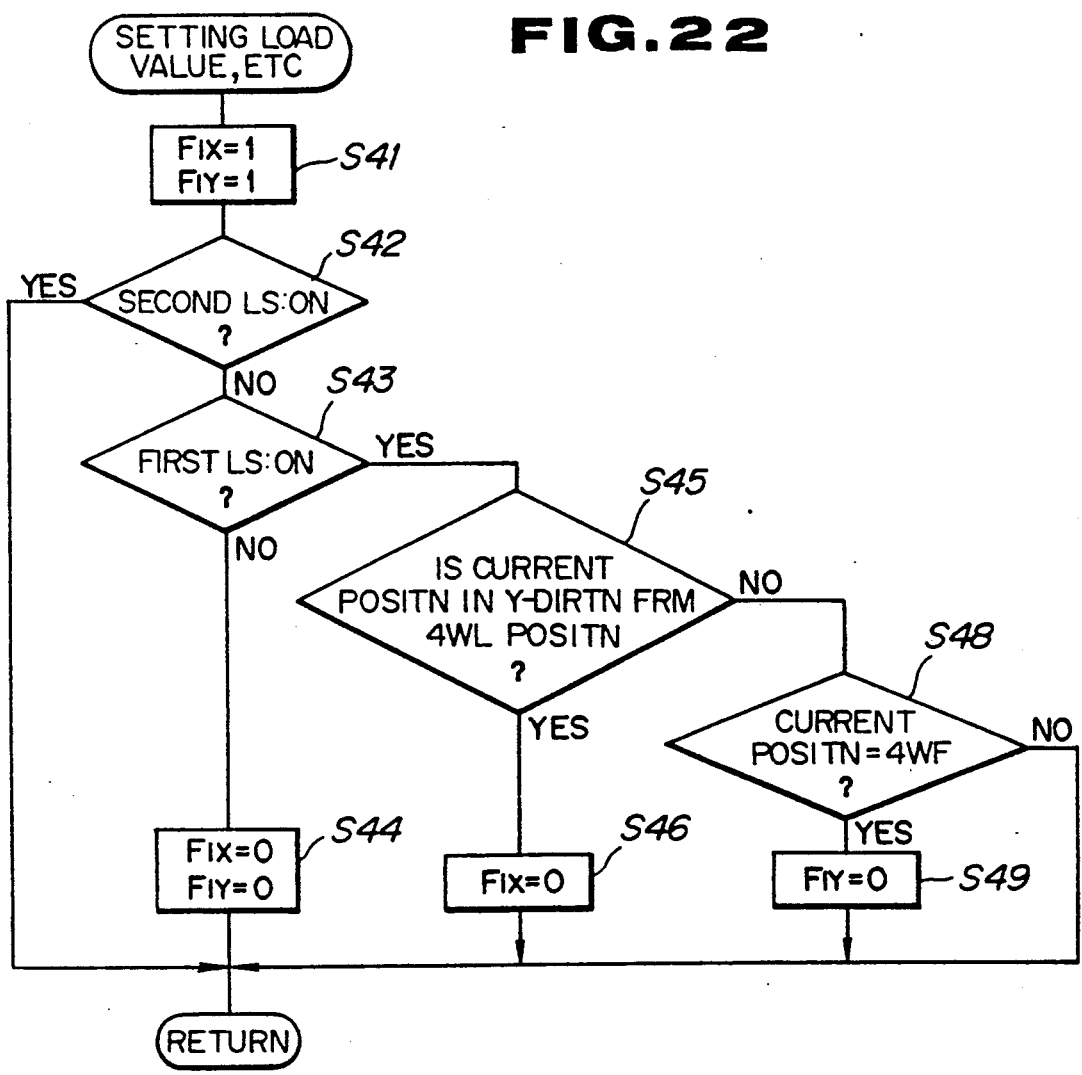

The load value setting operation of step S14 in FIG. 20 is implemented in accordance with the flow chart as shown in FIG. 22.

At step S41, an X-direction load value setting flag $F_{IX}$ is set to 1 and an Y-direction load value setting flag $F_{IY}$ is set to 1. Then at step S42, it is judged whether or not the second limit switch 70 is being turned ON. When the second limit switch 70 is in an ON state, the X-direction load value setting flag $F_{IX}$ and the Y-direction load value setting flag $F_{IY}$ are retained as they are, and the flow is returned. The second limit switch 70 is turned ON when the acceptable load to the motor 163 is above a second set value P2 (80 kg). Accordingly, as such a larger load is generated, the motor 163 is deenergized by means of the signal from the second limit switch 70, thereby preventing an overload from acting upon the motor 163. When the second limit switch 70 is being turned OFF, it is judged at step S43 whether the first limit switch 69 is ON. If the first limit switch 69 is OFF, the acceptable load to the motor 163 is lower than a first set value P1 (40 kg) and, then at step S44, the X-direction load value setting flag $F_{IX}$ is reset to 0 and the Y-direction load value setting flag $F_{IY}$ is reset to 0 as well. When both of the limit switches 69 and 70 are OFF, the signals from them are disregarded and the motor 163 can be energized either in the X-direction and in the Y-direction.

When the second limit switch 70 is OFF while the first limit switch 69 in ON—in other words, when the acceptable load to the motor 163 is in the range between the first set value P1 and the second set value P2 (40 kg to 80 kg)—it is judged at step S45 whether or not the current position is toward the Y-direction from the 4 WL position, namely, whether it is at either of the 2 W position or the first intermediate position α. If the current position is toward the Y-direction from the 4 WL position, the flow then proceeds to step S46 where the X-direction load value setting flag $F_{IX}$ is reset to 0. If the current position is judged at step S45 to be not located toward the Y-direction from the 4 WL position, it is then judged at step P48 whether it is at the 4 WF position. If it is located at the 4 WF position, then the flow proceeds to step S49 where the Y-direction load value setting flag $F_{IY}$ is reset to 0. If the current position is judged at step S48 to not be at the 4 WF position, the flow is returned.

As has been described hereinabove, the relationship of the current positions with the directions may be summarized as shown in FIG. 23. As shown by the symbol "X" in FIG. 23, an ON signal from the first limit switch 69 is disregarded at the 2 W position and the first intermediate position α with respect to the X-direction and at the 4 WF position with respect to the Y-direction. At these positions, the acceptable load to the motor 163 is accepted up to the second set value P2 (80 kg) at which the second limit switch 70 is turned ON. At the other positions, the load to the motor 163 is accepted up to the first set value P1 (40 kg) at which the first limit switch 69 is turned ON.

As the rotational direction and the acceptable load to the motor 163 are set in the manner as have been described hereinabove, the motor control as shown in step S15 in FIG. 16 is implemented in accordance with the flow chart as shown in FIG. 24.

In the motor control, first at step S51, it is judged whether or not the current position coincides with a target position. IF YES, at step S52, the X-direction rotation flag $F_X$ and the Y-direction rotation flag $F_Y$ are reset to 0. In other words, the motor 163 is not rotated in this case. Then the flow is returned.

When it is judged at step S51 that the current position does not agree with the target position, whether the current position is located on the side of the X-direction from the target position or not is judged at step S53. IF the current position is located on the side of the X-direction from the target position—namely, when the current position is desired to be operated toward the Y-direction, the X-direction rotation flag $F_X$ is reset to 1 at step S54 and then the flow proceeds to step S55 where it is further judged whether or not the Y-direction rotation accepting flag $F_{AY}$ is set to 1. When $F_{AY}=1$, then at step S56 the Y-direction rotation flag $F_Y$ is set to 1. When $F_{AY}=0$ at step S55, it is then judged whether or not the Y-direction load value setting flag $F_{IY}$ is set to 0. If YES at step S57, the flow proceeds to step S56 where the Y-direction rotation flag $F_Y$ is set to 1, and the flow is returned. IF $F_{IY}$ is not set to 0, then at step S58, the Y-direction rotation flag $F_Y$ is set to 0 and then flow is returned. In other words, when the rotation of the motor 163 in the Y-direction is accepted during operation in the Y-direction, the motor 163 is driven in that direction while the motor 163 is driven or suspended in accordance with a state of the first and second limit switches 69 and 70, respectively, when the rotation of the motor 163 in the Y-direction is not accepted.

Turning now to step S53, when the current position is not located on the side of the X-direction from the target position—in other words, when it is desired to be operated toward the X-direction—it is then judged at step S59 whether or not a free wheel is coupled. The free wheel is disposed on a differential (a front wheel differential) interposed between the front wheels to couple or uncouple a power transmission to one of the front wheels. When the free wheel is uncoupled, it is further judged at step S60 whether or not the current position is located on the side of the Y-direction from the 4 WL position. When the current position is located toward the Y-direction therefrom, in other words, when it is located at the 2 W position or at the first intermediate position α, the procedures from step S54 to step S58 are executed to suspend the operation toward the X-direction from the current position and to drive the motor 163 in the Y-direction opposite thereto in accordance with a state of the flag $F_{AY}$ or $F_{IY}$. This is to prevent a shift from the two-wheel to the four-wheel drive modes of operation in a state in which the free wheel is uncoupled.

In instances where the free wheel is coupled or the current position is located at the 4 WL position or on the side toward the X-direction from the 4 Wl position even if the free wheel would be uncoupled, when the current position is desired to be operated toward the X-direction located, then the Y-direction rotation flag $F_Y$ is reset to 0 at step S61 and it is judged at step S62 whether or not the X-direction rotation accepting flag $F_{AX}$ is set to 1. When $F_{AX}=1$ at step S62, the X-direction rotation flag $F_X$ is set to 1 as step S63. When $F_{AX}=0$ at step S62, it is judged at step S64 whether or not the X-direction rotation flag $F_X$ is set to 0. This arrangeflag $F_{IX}$ is set to 0, then the flow goes to step P63 where the X-direction the rotation flag $F_X$ is set to 11. If $F_{IX}=1$ at step S64, then the flow proceeds to step S65 and the X-direction rotation flag $F_X$ is set to O. This arrangement allows the motor 163 to be driven toward the X-direction if the rotation of the motor 163 in the X-direction is accepted and the motor 163 to be driven or suspended in accordance with a state of the first and second limit switches 69 and 70 if the rotation thereof in the X-direction is not accepted, during operation toward the Y-direction.

As have been described hereinabove, the motor 163 is driven to slide the shift sleeve 168 in the clutch mechanism 161 from the current position to the target position. In this case, particularly when the shift sleeve 168 is operated from one of the stroke end positions, namely, from the 4WF position, toward the Y-direction, the ON signal from the first limit switch 69 is disregarded at the 4WF position so that, if the sleeve 168 is slid with an operational force greater than the first set value P1 (40 kg), the motor 163 is deenergized by means of the ON signal from the first limit switch 69 as the sleeve 168 reached the second intermediate position $\beta$.

It is thus to be noted that the acceptable load to the motor 163 is set initially to 80 kg and thereafter to 40 kg. Thus, when a shift is implemented from the 4WF to the 4WL drive modes of operation without deenergizing the motor 163, the load to the motor 163 can be made smaller even if the initial load thereto would be larger. In other words, the spiral spring 63 as the load detecting means is wound in a large amount of deflection at an initial stage, however, its amount of deflection is decreased to a smaller degree. The variation in the amount of deflection of the spiral spring 63 can present a kind of buffer action over a power transmission passage to the sleeve 168 from the motor 163. It is further to be noted that the sleeve 168 can displace slowly in a stroke in accordance with a variation in the amount of deflection of the spring 63. This results in a slow shift from the 4WF to 4WL drive modes of operation, thus enabling a decrease in torque shock which may occur due to a differential-locked drive mode of operation.

It is to be understood that the foregoing text and the accompanying drawings relate to embodiments of the present invention given by way of examples but not limitation. Various other embodiments and variants are possible within the spirit and scope of the present invention.

What is claimed is:

1. A control apparatus for a power train shifting mechanism, comprising:

a shift mechanism for shifting a power train or a passage of transmitting power in accordance with a stroke displacement and for taking a shifting position at least at a first shift position which is a stroke end position and at a second shift position which is an intermediate stroke position other than the stroke end position;

a motor functioning as a source of driving the shift mechanism in a stroke;

load detecting means for detecting a load to be applied to the motor;

deenergizing means for deenergizing the motor when the load to be applied to the motor is equal to or greater than a given value; and load value conversion means for converting a first load value to a second load value which is larger than the first load value based on a comparison of a current shift position with the second shift position.

2. A control apparatus for a power train shifting mechanism, comprising:

a shift mechanism for shifting a power train or a passage of transmitting power in accordance with a stroke displacement and for taking a shift position at least at a first shift position which is a stroke end position and at a second shift position which is an intermediate stroke position other than the stroke end position;

a motor functioning as a source of driving the shift mechanism in a stroke;

load detecting means for detecting a load to be applied to the motor;

deenergizing means for deenergizing the motor when the load to be applied to the motor is equal to or greater than a given value; and load value conversion means for converting a first load value to a second load value which is larger than the first load value based on a comparison of a current shift position with the second shift position, wherein the power train is provided with a 2-4 shift unit for shifting between a two-wheel drive mode of operation in which either front wheels or rear wheels are driven and a four-wheel drive mode of operation in which all the front wheels and the rear wheels are driven.

3. A control apparatus as claimed in claim 2, wherein the 2-4 shift unit is shifted by a sleeve displaceable in an axial direction.

4. A control apparatus as claimed in claim 1, wherein:
   the power train is provided with a center differential for accepting a differential movement between the front wheels and the rear wheels; and
   the center differential is provided with a center-differential locking mechanism for restricting a differential movement between the front wheels and the rear wheels.

5. A control apparatus as claimed in claim 4, wherein a shift of the center-differential locking mechanism between a differential-locked drive mode of operation and a differential unlock drive mode of operation is implemented by means of a sleeve displaceable in an axial direction.

6. A control apparatus as claimed in claim 5, wherein the sleeve is displaced in a stroke by rotation of a cam coupled to an output shaft of the motor.

7. A control apparatus as claimed in claim 6, wherein:

the load detecting means is provided with a spring interposed between the cam and the motor; and the spring is urged toward a direction that restricts rotation of the motor relative to the cam.

8. A control apparatus as claimed in claim 7, wherein:

the first position is a differential unlock position, and the second position is a differential-locked position; and a load value for deenergizing the motor when the shift position is shifted from the first position to the second position is changed so as to be greater at an initial stage of shifting and to be smaller thereafter.

9. A control apparatus as claimed in claim 7, wherein the load value shifting means comprises a plurality of limit switches which are operable by a difference of relative rotations of the motor and the cam.

10. A control apparatus for a power train shifting mechanism, comprising:

a shift mechanism for shifting a power train or a passage of transmitting power in accordance with a stroke displacement and for taking a shift position at least at a first shift position which is a stroke end position and at a second shift position which is an intermediate stroke position other than the stroke end position;

a motor functioning as a source of driving the shift mechanism in a stroke;

load detecting means for detecting a load to be applied to the motor;

deenergizing means for deenergizing the motor when the load to be applied to the motor is equal to or greater than a given value; and load value conversion means for converting a first load value to a second load value which is larger than the first load value based on a comparison of a current shift position with the second shift position, wherein the power train is provided with a center differential for accepting a differential movement between front wheels and rear wheels as well as with a 2-4 shift unit for shifting between a two-wheel drive mode for driving the front wheels the or rear wheels and a four-wheel drive mode of operation for driving the front wheels and the rear wheels; and the center differential is provided with a differential locking mechanism for restricting differential movement between the front wheels and the rear wheels.

11. A control apparatus as claimed in claim 10, wherein the 2-4 shift unit for shifting between a two-wheel drive mode of operation and a four-wheel drive mode of operation and the differential locking mechanism for shifting between a differential-locked drive mode of operation and a differential unlocked drive mode of operation are shifted by means of a common sleeve which is displaceable in an axial direction.

12. A control apparatus as claimed in claim 11, wherein the common sleeve is displaced in a stroke by rotation of a cam coupled to an output shaft of the motor.

13. A control apparatus as claimed in claim 12, wherein:

the load detecting means is provided with a spring interposed between the cam and the motor; and the spring is urged toward a direction that restricts rotation of the motor relative to the cam.

14. A control apparatus as claimed in claim 13, wherein:

the first position is a differential unlocked position, and the second position is a differential-locked position; and a load value for deenergizing the motor when the shift position is shifted from the first position to the second position is changed so as to be greater at an initial stage of shifting and to be smaller thereafter.

15. A control apparatus as claimed in claim 14, wherein the load value shifting means comprises a plurality of limit switches which are operable by a difference of relative rotations of the motor and the cam.

16. A control apparatus as claimed in claim 15, wherein:

the power train is provided with a subordinate variable speed gear assembly;

the center differential is disposed adjacent to the subordinate variable speed gear assembly;

a shift mechanism of the subordinate variable speed gear assembly is disposed at a position opposite to a position at which the center differential is disposed; and a shift mechanism of the center differential for shifting between a differential-locked drive mode of operation and a differential unlocked drive mode of operation is disposed at a position opposite to a position at which the subordinate variable speed gear assembly is disposed.

* * * * *